United States Patent
Oyama et al.

(10) Patent No.: US 11,225,048 B2
(45) Date of Patent: Jan. 18, 2022

(54) LAMINATED NONWOVEN FABRIC

(71) Applicant: Toray Industries, Inc., Tokyo (JP)

(72) Inventors: Kumi Oyama, Otsu (JP); Makoto Nakahara, Otsu (JP); Hiroshi Kajiyama, Otsu (JP)

(73) Assignee: Toray Industries, Inc., Tokyo (JP)

( * ) Notice: Subject to any disclaimer, the term of this patent is extended or adjusted under 35 U.S.C. 154(b) by 239 days.

(21) Appl. No.: 16/488,324

(22) PCT Filed: Feb. 21, 2018

(86) PCT No.: PCT/JP2018/006295
§ 371 (c)(1),
(2) Date: Aug. 23, 2019

(87) PCT Pub. No.: WO2018/159421
PCT Pub. Date: Sep. 7, 2018

(65) Prior Publication Data
US 2019/0375187 A1    Dec. 12, 2019

(30) Foreign Application Priority Data

Feb. 28, 2017 (JP) .............................. JP2017-036094
Dec. 19, 2017 (JP) .............................. JP2017-242610

(51) Int. Cl.
*B32B 5/26* (2006.01)
*A41G 7/00* (2006.01)
*B32B 5/02* (2006.01)
*D04H 1/4374* (2012.01)

(52) U.S. Cl.
CPC ................. *B32B 5/26* (2013.01); *A41G 7/00* (2013.01); *B32B 5/022* (2013.01); *D04H 1/4374* (2013.01); *B32B 2262/0261* (2013.01); *B32B 2262/0276* (2013.01); *B32B 2437/00* (2013.01)

(58) Field of Classification Search
CPC .................................... B32B 5/25; B32B 5/26
See application file for complete search history.

(56) References Cited

U.S. PATENT DOCUMENTS

| 2007/0196649 A1 | 8/2007 | Kamiyama et al. |
| 2008/0069845 A1 | 3/2008 | Makihara et al. |
| 2012/0107387 A1 | 5/2012 | Ochiai et al. |
| 2014/0120336 A1 | 5/2014 | Masuda et al. |

FOREIGN PATENT DOCUMENTS

| JP | 2007070347 A | 3/2007 |
| JP | 2009097120 A | 5/2009 |
| JP | 2013240432 A | 12/2013 |
| JP | 2015045114 A | 3/2015 |
| WO | 2005095686 A1 | 10/2005 |
| WO | 2006016601 A1 | 2/2006 |
| WO | 2011004834 A1 | 1/2011 |
| WO | 2012173116 A1 | 12/2012 |
| WO | 2017122625 A1 | 7/2017 |

OTHER PUBLICATIONS

International Search Report and Written Opinion for International Application No. PCT/JP2018/006295, dated Apr. 17, 2018, 5 pages. 2018.

*Primary Examiner* — William P Watkins, III
(74) *Attorney, Agent, or Firm* — RatnerPrestia

(57) ABSTRACT

The present invention provides a laminated nonwoven fabric achieving both handling properties during manufacturing and use and adherence to a skin surface at a high level particularly when used for a face mask. The laminated nonwoven fabric includes a nonwoven fabric layer (A) and a nonwoven fabric layer (B). The nonwoven fabric layer (A) is formed from a fiber A having a single fiber diameter of 50 nm or more and 800 nm or less, and the nonwoven fabric layer (B) is formed from a fiber B having a single fiber diameter of 3 μm or more and 30 μm or less. The nonwoven fabric layer (B) includes 15 to 40% by mass of a fiber B1 to all of the fibers constituting the nonwoven fabric layer (B), the fiber having tensile strength of 2.0 cN/dtex or less as measured based on JIS L 1015: 2010 8.7.2. The nonwoven fabric layer (B) Includes a fiber B2 having tensile strength exceeding 2.0 cN/dtex as measured based on JIS L 1015: 2010 8.7.2. The nonwoven fabric layer (A) is disposed as an outermost layer of at least one surface.

12 Claims, No Drawings

LAMINATED NONWOVEN FABRIC

CROSS REFERENCE TO RELATED APPLICATIONS

This is the U.S. National Phase application of PCT/JP2018/006295, filed Feb. 21, 2018, which claims priority to Japanese Patent Application No. 2017-036094, filed Feb. 28, 2017 and Japanese Patent Application No. 2017-242610, filed Dec. 19, 2017, the disclosures of these applications being incorporated herein by reference in their entireties for all purposes.

FIELD OF THE INVENTION

The present invention relates to a laminated nonwoven fabric in which a plurality of nonwoven fabric layers are laminated, and a face mask using the laminated nonwoven fabric.

BACKGROUND OF THE INVENTION

In recent years, the demand for nonwoven fabrics has continued to expand as applications of skin care cosmetics utilizing liquid retention and texture. The skin care cosmetics, for example, retain a facial lotion on the surface of a skin for a certain period of time, whereby the facial lotion sufficiently penetrates into the skin to impart effects such as whitening, moisturizing, and anti-aging to users. Therefore, various products have been proposed.

Specifically, the following face masks are known as an example of the skin care cosmetics.

Patent Document 1 discloses a face mask using a laminated nonwoven fabric. The laminated nonwoven fabric includes an ultrafine fiber layer and a hydrophilic fiber layer. The hydrophilic fiber layer also includes a hydrophilic fiber such as pulp or cotton. Since the content of the hydrophilic fiber in the hydrophilic fiber layer is 50% by mass or more, the face mask has excellent water retention, and the amount of a facial lotion held by the face mask is excellent.

Patent Document 2 also discloses a face mask using a laminated nonwoven fabric. The laminated nonwoven fabric includes a nonwoven fabric layer formed from a nanofiber (hereinafter, nanofiber layer), and a nonwoven fabric layer formed from a cotton fiber (hereinafter, cotton fiber layer). Since the face mask includes the cotton fiber layer, the face mask has excellent water retention, and the amount of a facial lotion held by the face mask is excellent.

A nonwoven fabric including a fiber having an extremely thin fiber diameter and a face mask using a laminated nonwoven fabric have also been proposed.

Specifically, in Patent Document 3, the following face mask has been proposed. A substrate is a nonwoven fabric including a specific content (5 to 50% by mass based on the entire substrate) of a synthetic fiber having a fiber diameter of 50 to 1000 nm, whereby the face mask has a tightening effect (lift-up effect) of a loose face line.

In Patent Document 2, a nonwoven fabric for skin sticking having excellent adherence and liquid retention has been proposed. The nonwoven fabric is a laminated nonwoven fabric including a nonwoven fabric layer formed from a nanofiber having a number average single fiber diameter of 1 to 500 nm and constituted by laminating and integrating at least two or more nonwoven fabric layers.

Furthermore, in Patent Document 4, in order to provide a face mask having excellent softness, water absorbability, and wiping performance, the following face mask has been proposed. The face mask includes a fiber obtained by subjecting a sea-island type conjugate fiber in which an island component is as fine as nano-order, and the diameter and cross-sectional shape of the island component are uniform to a sea-removal treatment.

PATENT DOCUMENTS

Patent Document 1 International Publication No. 2006/016601

Patent Document 2 Japanese Patent Laid-Open Publication No. 2007-70347

Patent Document 3 Japanese Patent Laid-Open Publication No. 2013-240432

Patent Document 4 International Publication No. 12/173116

SUMMARY OF THE INVENTION

The laminated nonwoven fabrics disclosed in Patent Document 1 and Patent Document 2 described above have excellent water retention and an excellent amount of the facial lotion held by the laminated nonwoven fabrics. Therefore, the face mask using the laminated nonwoven fabrics has excellent water retention, and has also an excellent amount of the facial lotion held by the face mask. However, since the laminated nonwoven fabrics include a large amount of hydrophilic fiber such as cotton having high flexibility, the laminated nonwoven fabrics tend to have extremely high flexibility. Therefore, these laminated nonwoven fabrics have poor handling properties. Therefore, when the laminated nonwoven fabrics are used for the face mask, the face mask disadvantageously tends to have poor handling properties during manufacturing and use of the face mask.

Then, in order to solve the problem, it is considered to take the following means. It is considered to increase the basis weight of a nonwoven fabric layer formed from a fiber having a larger single fiber diameter in the nonwoven fabric layer included in the laminated nonwoven fabric used for the face mask (the nonwoven fabric layer is a nonwoven fabric layer having a function as a support layer, hereinafter, sometimes referred to as the support layer). That is, it is considered to increase the basis weights of the hydrophilic fiber layer and cotton fiber layer included in the laminated nonwoven fabrics. Then, when the laminated nonwoven fabric is used for the face mask, the flexibility of the face mask deteriorates, which tends to provide improved handling properties of the face mask. However, in such a case, the basis weight of the support layer in the laminated nonwoven fabric increases, so that the skin following property to the skin surface of the user of the face mask (hereinafter, the skin surface of the user of the face mask is sometimes referred to as the skin surface) deteriorates. In particular, the face mask advantageously comes off from the skin surface in a portion from the user's nose tip to the user's cheek. That is, there is a problem that the adherence of the face mask to the skin surface is poor. In such a case, the basis weight of the hydrophilic fiber such as a cotton fiber in the face mask increases, so that the amount of liquid cosmetic held per unit area of the face mask also increases, and the mass of the entire face mask also increases. The increase of the mass of the entire face mask causes the face mask to easily come off from the skin surface. Therefore, this also causes reduced adherence of the face mask to the skin surface.

That is, there is a problem that a laminated nonwoven fabric does not exist, which achieves both handling properties during manufacturing and use and adherence to the skin surface at a high level when used for the face mask.

Therefore, in view of the above-mentioned circumstances, the object 1 of the present invention 1 is to provide a laminated nonwoven fabric achieving handling properties during manufacturing and use and adherence to the skin surface at a high level when used for a face mask.

The present inventors have found that, in the above Patent Document 3, there is no clear provision related to the variation of the fiber diameter of the fiber used for the nonwoven fabric, and when a fiber having large variation of the fiber diameter is used, the adherence of the face mask to the user's skin disadvantageously deteriorates. Furthermore, the present inventors also have found that the adherence of a face mask to the skin of the user disadvantageously deteriorates, when the face mask includes 5 to 50% by mass of a synthetic fiber having a fiber diameter of 50 to 1000 nm and further includes a polyethylene terephthalate fiber having a fiber diameter of 3 μm and a rayon fiber having a fiber diameter of 9 μm in addition to the synthetic fiber.

The nonwoven fabric for skin sticking disclosed in Patent Document 2 has no provision related to the variation of the fiber diameter, and when a fiber having large variation of the fiber diameter is used, the adherence of the face mask to the user's skin disadvantageously deteriorates, as described above.

Furthermore, the present inventors have found that, as disclosed in Patent Document 4, when the nonwoven fabric including only an ultrafine fiber obtained by subjecting a sea-island type conjugate fiber having an island component diameter (fiber diameter) of 10 to 1000 nm to a sea-removal treatment is used for the face mask, the face mask is deformed due to tensile stress occurring when the face mask is worn, which disadvantageously causes deteriorated lift-up property of the face mask.

Therefore, it is the object 2 of the present invention 2 to provide a laminated nonwoven fabric having excellent adherence to the skin, liquid retention, and lift-up property which are important as the characteristics of the face mask when used for the face mask.

In order to solve the above-mentioned problems, the present invention has the following configurations. That is, (1) A laminated nonwoven fabric including a nonwoven fabric layer (A) and a nonwoven fabric layer (B), in which the nonwoven fabric layer (A) is formed from a fiber A having a single fiber diameter of 50 nm or more and 800 nm or less, the nonwoven fabric layer (B) is formed from a fiber B having a single fiber diameter of 3 μm or more and 30 μm or less, the nonwoven fabric layer (B) includes 15 to 40% by mass of a fiber B1 based on all of the fibers constituting the nonwoven fabric layer (B), the fiber having tensile strength of 2.0 cN/dtex or less as measured based on JIS L 1015: 2010 8.7.2, the nonwoven fabric layer (B) includes a fiber B2 having tensile strength exceeding 2.0 cN/dtex as measured based on JIS L 1015: 2010 8.7.2, and the nonwoven fabric layer (A) is disposed as an outermost layer of at least one surface.

(2) The laminated nonwoven fabric according to (1), in which the laminated nonwoven fabric has wet stiffness of 0.12 mN or more and 0.18 mN or less as measured based on JIS L 1913: 2010.6.7.3, and the laminated nonwoven fabric has wet tensile strength of 15 N/25 mm or more and 50 N/25 mm or less as measured based on JIS L 1913: 2010.6.3.2.

(3) The laminated nonwoven fabric according to (1) or (2), in which the laminated nonwoven fabric has a basis weight of 30 g/m² or more and 65 g/m² or less, and the laminated nonwoven fabric has a thickness of 0.3 mm or more and 1.3 mm or less.

(4) The laminated nonwoven fabric according to (3), in which a thickness ratio (A/B) of the nonwoven fabric layer (A) to the nonwoven fabric layer (B) is 0.05 or more and 0.67 or less.

(5) The laminated nonwoven fabric according to any one of (1) to (4), in which the fiber B1 having tensile strength of 2.0 cN/dtex or less as measured based on JIS L 1015: 2010 8.7.2 has a single fiber diameter of 3 μm or more and 8 μm or less.

(6) The laminated nonwoven fabric according to any one of (1) to (5), in which a variation of the single fiber diameter of the fiber A is 1.0 to 20.0%.

(7) The laminated nonwoven fabric according to any one of (1) to (6), in which the fiber A has a single fiber diameter of 100 nm or more and 400 nm or less.

(8) The laminated nonwoven fabric according to any one of (1) to (7), in which the fiber A is a polyamide fiber.

(9) The laminated nonwoven fabric according to any one of (1) to (8), in which the nonwoven fabric layer (B) includes the fiber B which is a polyester fiber, and a content of the fiber B which is the polyester fiber to the total mass of the fibers constituting the nonwoven fabric layer (B) is 60% by mass or more and 85% by mass or less.

(10) The laminated nonwoven fabric according to any one of (1) to (9), in which the fiber B1 having tensile strength of 2.0 cN/dtex or less as measured based on JIS L 1015: 2010 8.7.2 is a regenerated fiber, a semi-synthetic fiber, or an animal natural fiber, and the fiber B1 is included in an amount of 9 to 36% by mass based on the entire laminated nonwoven fabric.

(11) A laminated nonwoven fabric including a nonwoven fabric layer (A) and a nonwoven fabric layer (B), in which the nonwoven fabric layer (A) is formed from a fiber A having a single fiber diameter of 50 nm or more and 800 nm or less, a variation of the single fiber diameter of the fiber A is 1.0 to 20.0%, the nonwoven fabric layer (B) is formed from a fiber B having a single fiber diameter of 3 μm or more and 100 μm or less, and the nonwoven fabric layer (A) is disposed as an outermost layer of at least one surface of the laminated nonwoven fabric.

(12) The laminated nonwoven fabric according to (11), in which the fiber A has a single fiber diameter of 100 nm or more and 400 nm or less.

(13) The laminated nonwoven fabric according to (11) or (12), in which the fiber B is a polyester fiber, and the fiber B is included in an amount of 90% by mass or more based on the total mass of the nonwoven fabric layer (B).

(14) The laminated nonwoven fabric according to any one of (1) to (13), in which a coefficient of static friction of a surface of the laminated nonwoven fabric which is the nonwoven fabric layer (A) disposed as an outermost layer with respect to a simulated silicon skin surface is 1.5 or more.

(15) A face mask including the laminated nonwoven fabric according to any one of (1) to (14).

The present invention 1 can provide a laminated nonwoven fabric achieving handling properties during manufacturing and use and adherence to the skin surface at a high level when used for a face mask.

The present invention 2 can provide a laminated nonwoven fabric having excellent adherence to the skin, liquid retention, and lift-up property which are important as the characteristics of the face mask when used for the face mask.

DETAILED DESCRIPTION OF EMBODIMENTS OF THE INVENTION

Hereinafter, an embodiment of the present invention 1 will be described in detail. A laminated nonwoven fabric of the present invention 1 includes a nonwoven fabric layer (A) and a nonwoven fabric layer (B). The nonwoven fabric layer (A) is formed from a fiber A having a single fiber diameter of 50 nm or more and 800 nm or less. The nonwoven fabric layer (A) is disposed as the outermost layer of at least one surface of the laminated nonwoven fabric. Here, in the case where the laminated nonwoven fabric is formed from two nonwoven fabric layers, each of the two nonwoven fabric layers is the outermost layer.

The nonwoven fabric layer (B) is formed from a fiber B having a single fiber diameter of 3 μm or more and 30 μm or less. The nonwoven fabric layer (B) includes 15 to 40% by mass of a fiber B1 based on all of the fibers constituting the nonwoven fabric layer (B), the fiber having tensile strength of 2.0 cN/dtex or less as measured based on JIS L 1015: 2010 8.7.2. The nonwoven fabric layer (B) further includes a fiber B2 having tensile strength exceeding 2.0 cN/dtex as measured based on JIS L 1015: 2010 8.7.2.

A face mask using the laminated nonwoven fabric of the present invention 1 having the above-mentioned configuration achieves both handling properties during manufacturing and use and adherence to a skin surface at a high level. Excellent handling properties during use mean that, when the face mask is taken out of a facial lotion, for example, the face mask is not too soft, and has excellent handling easiness when the face mask is treated by human hands.

First, the nonwoven fabric layer (A) will be described. The nonwoven fabric layer (A) is formed from the fiber A which is an ultrafine fiber having a single fiber diameter of 50 nm or more and 800 nm or less. The nonwoven fabric layer (A) is disposed as the outermost layer of at least one surface of the laminated nonwoven fabric. By using the face mask using the laminated nonwoven fabric so that the nonwoven fabric layer (A) is in contact with the user's skin surface, the fiber A which is an ultrafine fiber penetrates into the fine grooves of the skin surface, whereby a contact area between the nonwoven fabric layer (A) and the skin surface increases. Therefore, the nonwoven fabric layer (A) is formed from the fiber A which is an ultrafine fiber as the feature, which contributes to the improvement of adherence between the face mask and the skin surface. The single fiber diameter of the fiber A is set to 50 nm or more, which makes it possible to prevent the fiber A from falling off and remaining on the skin surface when the face mask using the laminated nonwoven fabric is used. Meanwhile, the single fiber diameter of the fiber A is set to 800 nm or less, whereby, as described above, the contact area between the skin surface and the fiber surface increases, which causes the contact area between the skin surface and the nonwoven fabric layer (A) to increase. This provides an improved coefficient of friction between the face mask using the laminated nonwoven fabric and the skin surface. Therefore, the face mask is prevented from slipping on the skin surface, whereby the adherence of the face mask to the skin surface can be effectively achieved. From the above viewpoint, the upper limit of the single fiber diameter of the fiber A is more preferably 600 nm or less, still more preferably 400 nm or less, and particularly preferably 300 nm or less. From two viewpoints of the improvement of the adherence of the face mask to the skin surface and the improvement of the productivity of the face mask, the single fiber diameter of the fiber A is preferably 100 nm or more and 600 nm or less.

Here, the nonwoven fabric layer (A) is formed from the fiber A, but the nonwoven fabric layer (A) may be formed from only the fiber A. The nonwoven fabric layer (A) may include fibers other than the fiber A (for example, fibers having a single fiber diameter of 1000 nm or more) in a range in which the effect of the present invention 1 is not impaired. Here, the range in which the effect of the present invention 1 is not impaired means a range in which the adhesion of the surface of the laminated nonwoven fabric in which the nonwoven fabric layer (A) is disposed as the outermost layer to a simulated silicon skin surface is 1.20 or more.

The variation of the single fiber diameter of the fiber A which is an ultrafine fiber is preferably 20.0% or less. Since the variation of the single fiber diameter of the fiber A is 20.0% or less, the extremely fine fiber A having a uniform single fiber diameter penetrates into fine irregularities of the skin surface, which prevents voids from being formed between the skin surface and the surface of the nonwoven fabric layer (A), whereby the contact area between the skin surface and the nonwoven fabric layer (A) increases. This provides an improved coefficient of friction between the face mask using the laminated nonwoven fabric of the present invention 1 and the skin surface, whereby the face mask is prevented from slipping on the skin surface. As a result, the adherence of the face mask to the skin surface is further improved. A mechanism in which the penetration of the ultrafine fiber A having a uniform single fiber diameter into the fine irregularities of the skin surface is promoted when the variation of the single fiber diameter is 20.0% or less is considered as follows. That is, this is considered to be because, if the variation of the single fiber diameter is 20.0% or less, the existence probability of the fiber A having a large single fiber diameter decreases, and the fiber A having a large single fiber diameter blocks the opening of the fine irregularities of the skin surface, so that the inhibition of the penetration of the fiber A having a small single fiber diameter into the irregularities is prevented.

Furthermore, when the variation of the single fiber diameter of the fiber A is 20.0% or less, nano-order fine uniform voids are formed between the fibers of the fiber A, whereby liquid retention can be effectively obtained by the capillary effect due to the voids.

Here, the single fiber diameter of the fiber A is 50 to 400 nm, and the variation of the single fiber diameter of the fiber A is 20.0% or less, whereby the ultrafine fiber A having a uniform single fiber diameter penetrates into the fine irregularities of the skin surface. As a result, the contact area between the skin surface and the nonwoven fabric layer (A) is very large. Therefore, the adherence of the face mask using the laminated nonwoven fabric of the present invention 1 to the skin surface is extremely excellent, whereby one of the most preferable forms which can be taken by the laminated nonwoven fabric is provided. It is particularly preferable that the single fiber diameter of the fiber A is 100 to 400 nm, and the variation of the single fiber diameter of the fiber A is 20.0% or less because the above effect is more excellent.

From the above viewpoint, the variation of the single fiber diameter of the fiber A is preferably smaller. The variation is preferably 15.0% or less, more preferably 10.0% or less, and still more preferably 7.0% or less.

The lower limit of the variation of the single fiber diameter of the fiber A is not particularly limited, but it is preferably 1.0% or more.

The variation of the single fiber diameter of the fiber A can be measured by photographing an image with a scanning electron microscope (SEM).

The fiber A may be in a form of individually dispersed single fibers, partially bonded single fibers, or an aggregate of a plurality of single fibers, and the like. That is, regardless of the length or the cross-sectional shape, the fiber A may be in a so-called fibrous form.

As a material of the fiber A used in the present invention 1, thermoplastic resins such as polyester, polyamide, and polyolefin can be used. Among these, in terms of enhancing the above-mentioned adherence, the fiber A is preferably a polyamide fiber. By using the polyamide fiber having water absorbability as the fiber A having a single fiber diameter of 50 nm or more and 800 nm or less, a capillary effect of absorbing the facial lotion between the face mask and the skin surface using the laminated nonwoven fabric of the present invention 1 is enhanced. Furthermore, the contact area between the face mask and the skin surface increases, whereby the above-mentioned adherence can be further enhanced. These thermoplastic resins may be polymerized with other components, or may include additives such as a stabilizer.

As the polyamide which can constitute the fiber A, for example, nylon 6, nylon 11, nylon 12, nylon 66, and various aramid resins can be used. Among these, nylon 6 having favorable water absorbability is preferably used.

The basis weight of the nonwoven fabric layer (A) used in the present invention 1 is preferably 3 to 40 g/m$^2$, and the lower limit thereof is more preferably 5 g/m$^2$ or more. Meanwhile, the upper limit thereof is more preferably 25 g/m$^2$ or less, and still more preferably 15 g/m$^2$ or less. By setting the basis weight to 3 g/m$^2$ or more, the adherence of the face mask using the laminated nonwoven fabric of the present invention 1 to the skin surface is more excellent. Meanwhile, by setting the basis weight to 40 g/m$^2$ or less, the manufacturing loss of an easily soluble polymer occurring in a manufacturing step to be described later can be reduced.

From the viewpoint that the adherence between the face mask using the laminated nonwoven fabric of the present invention 1 and the user's skin surface is excellent, the nonwoven fabric layer (A) is disposed as the outermost layer of at least one surface of the laminated nonwoven fabric. Therefore, examples of a specific aspect of the laminated nonwoven fabric include a two-layer laminated structure (nonwoven fabric layer (B)/nonwoven fabric layer (A)) in which the nonwoven fabric layer (A) is disposed on one surface of the nonwoven fabric layer (B) to be described later, and a three-layer laminated structure (nonwoven fabric layer (A)/nonwoven fabric layer (B)/nonwoven fabric layer (A)) in which the nonwoven fabric layer (A) is disposed on each of both surfaces of the nonwoven fabric layer (B).

Next, the nonwoven fabric layer (B) will be described. The nonwoven fabric layer (B) is formed from a fiber B having a single fiber diameter of 3 μm or more and 30 μm or less. The nonwoven fabric layer (B) further includes 15 to 40% by mass of a fiber B1 having tensile strength of 2.0 cN/dtex or less as measured based on JIS L 1015: 2010 8.7.2 (hereinafter, referred to as a fiber B1) based on all of the fibers constituting the nonwoven fabric layer (B). The nonwoven fabric layer (B) includes 15 to 40% by mass of a fiber B2 having tensile strength exceeding 2.0 cN/dtex as measured based on JIS L 1015: 2010 8.7.2 (hereinafter, referred to as a fiber B2) based on all of the fibers constituting the nonwoven fabric layer (B). Here, the fiber diameter of the fiber B constituting the nonwoven fabric layer (B) is as thin as 30 μm or less, and a part of the fiber B constituting the nonwoven fabric layer (B) (that is, the fiber B1) has tensile strength of 2.0 cN/dtex or less as measured based on JIS L 1015: 2010 8.7.2, i.e., high flexibility, whereby the skin following property of the face mask using the laminated nonwoven fabric including the nonwoven fabric layer (B) to the skin surface is improved. As a result, the adherence of the face mask using the laminated nonwoven fabric to the skin surface is excellent. Here, the skin following property of the face mask to the skin surface refers to, for example, sticking performance of the face mask along irregularities on the user's face when the face mask is used (a region from the user's nose tip to cheek, and the like). The fiber B constituting the nonwoven fabric layer (B) is thin, and a part of the fiber B constituting the nonwoven fabric layer (B) have high flexibility, whereby the laminated nonwoven fabric has excellent softness during bending and stretching and also has excellent flexibility. This makes it possible to flexibly bend the face mask using the laminated nonwoven fabric along the irregularities of the user's face, and to extend the face mask using the laminated nonwoven fabric along the irregularities of the user's face. As a result, it is considered that the skin following property of the face mask using the laminated nonwoven fabric to the skin surface is excellent.

The single fiber diameter of the fiber B is 3 μm or more, whereby the strength of the laminated nonwoven fabric including the nonwoven fabric layer (B) is excellent, which contributes to excellent handling properties during manufacturing and use of the face mask using the laminated nonwoven fabric.

Furthermore, because the above mechanism provides more excellent skin following property of the face mask to the skin surface, which provides excellent adherence of the face mask to the skin surface, the single fiber diameter of the fiber B1 having tensile strength of 2.0 cN/dtex or less as measured based on JIS L 1015: 2010 8.7.2 is more preferably 3 μm or more and 20 μm or less, still more preferably 3 μm or more and 10 μm or less, and particularly preferably 3 μm or more and 8 μm or less.

The nonwoven fabric layer (B) includes the fiber B1 having a low wet modulus, i.e., tensile strength (hereinafter, sometimes merely referred to as wet strength) of 2.0 cN/dtex or less as measured based on JIS L 1015: 2010 8.7.2. In the case where the laminated nonwoven fabric is used for the face mask, from the viewpoint that the skin following property of the face mask to the fine irregularities of the skin surface is further improved, which provides more excellent adherence of the face mask to the skin surface, the wet strength of the fiber B1 is preferably 1.7 cN/dtex or less, and more preferably 1.5 cN/dtex or less. The lower limit of the wet strength of the fiber B1 is not particularly limited, but it is preferably 0.8 cN/dtex or more from the viewpoint that more excellent handling properties during manufacturing and use of the face mask can be provided.

The laminated nonwoven fabric of the present invention 1 includes 15 to 40% by mass of the fiber B1 based on all of the fibers constituting the nonwoven fabric layer (B). The content of the fiber B1 is 40% by mass or less because the handling properties during manufacturing and use of the face mask using the laminated nonwoven fabric of the present invention 1 are excellent. Meanwhile, because the above-mentioned mechanism provides excellent skin following property of the face mask to the skin surface, which provides excellent adherence of the face mask to the skin surface, the content of the fiber B1 is 15% by mass or more, more preferably 20% or more, and particularly preferably 30% or more.

As the fiber B1 used in the present invention 1, rayon and cupra which are regenerated fibers, acetate and triacetate which are semi-synthetic fibers, and wool and silk which are animal natural fibers can be used. Among these, the fiber B1 is preferably rayon because the skin following property of the face mask to the skin surface is more excellent, which can provide more excellent adherence of the face mask to the skin surface.

Furthermore, it is preferable that, when the fiber B1 is the above-mentioned regenerated fiber, semi-synthetic fiber, or animal natural fiber, the fiber B1 is included in an amount of 9 to 36% by mass based on the entire laminated nonwoven fabric. Because the handling properties during manufacturing and use of the face mask using the laminated nonwoven fabric of the present invention 1 are excellent, the content of the fiber B1, which is the regenerated fiber, the semi-synthetic fiber, or the animal natural fiber, based on the entire laminated nonwoven fabric is 36% by mass or less. Meanwhile, because the above mechanism provides excellent skin following property of the face mask to the skin surface, which provides excellent adherence of the face mask to the skin surface, the content of the fiber B1, which is the regenerated fiber, the semi-synthetic fiber, or the animal natural fiber, based on the entire laminated nonwoven fabric is 9% by mass or more, more preferably 15% by mass or more, and particularly preferably 20% by mass or more.

The nonwoven fabric layer (B) includes the fiber B2 other than the fiber B1. As the fiber B2, synthetic fibers such as a polyester fiber, a polyamide fiber, and a polyolefin fiber as a fiber generally having high strength in a wet state, plant natural fibers such as cotton and hemp, and regenerated fibers such as lyocell or tencel can be used. Among these, because more excellent handling properties during manufacturing and use of the face mask using the laminated nonwoven fabric of the present invention 1 can be provided, the fiber B2 is preferably a polyethylene terephthalate fiber. Because more excellent handling properties during manufacturing and use of the face mask using the laminated nonwoven fabric of the present invention 1 can be provided, the content of the fiber B2 in the mass of all of the fibers constituting the nonwoven fabric layer (B) is preferably 60% by mass or more and 85% by mass or less. It is preferable that content of the polyethylene terephthalate fiber in the mass of all of the fibers constituting the nonwoven fabric layer (B) is 60% by mass or more and 85% by mass or less because more excellent handling properties during manufacturing and use of the face mask using the laminated nonwoven fabric of the present invention 1 can be provided.

The nonwoven fabric layer (B) may be formed from only the fiber B, or may include a fiber other than the fiber B (for example, a fiber having a single fiber diameter of 800 nm or less) in a range in which the effect of the present invention 1 is not inhibited. Here, the range in which the effect of the present invention 1 is not impaired means a range in which the laminated nonwoven fabric has wet stiffness of 0.12 mN or more and 0.18 mN or less as measured based on JIS L 1913: 2010.6.7.3, and wet tensile strength of 15 N/25 mm or more and 50 N/25 mm or less as measured based on JIS L 1913: 2010.6.3.2.

The basis weight of the nonwoven fabric layer (B) of the present invention 1 is preferably 15 to 60 $g/m^2$, and the lower limit thereof is more preferably 20 $g/m^2$ or more. Meanwhile, the upper limit thereof is more preferably 55 $g/m^2$ or less, and still more preferably 50 $g/m^2$ or less. Among the nonwoven fabric layers constituting the laminated nonwoven fabric, the nonwoven fabric layer (B) has a function as a support layer, whereby the strength of the laminated nonwoven fabric is improved by setting the basis weight to 15 $g/m^2$ or more, which provides excellent handling properties during manufacturing and use of the face mask using the laminated nonwoven fabric. As described in the section "PROBLEMS TO BE SOLVED BY THE INVENTION", when the basis weight of the nonwoven fabric layer (B) increases, the strength of the laminated nonwoven fabric is improved, which provides excellent handling properties during manufacturing and use of the face mask using the laminated nonwoven fabric. However, meanwhile, the adherence of the face mask using the laminated nonwoven fabric to the skin surface is poor. Therefore, the basis weight of the nonwoven fabric layer (B) included in the laminated nonwoven fabric is preferably 60 $g/m^2$ or less. In the laminated nonwoven fabric of the present invention 1, the nonwoven fabric layer (B) included in the laminated nonwoven fabric is formed from a fiber B having a single fiber diameter of 3 μm or more and 30 μm or less, and the nonwoven fabric layer (B) includes 15 to 40% by mass of a fiber B1 having tensile strength of 2.0 cN/dtex or less as measured based on JIS L 1015: 2010, 8.7.2 based on the entire laminated nonwoven fabric layer (B). Therefore, even if the basis weight of the nonwoven fabric layer (B) is 60 $g/m^2$ or less, the strength of the laminated nonwoven fabric of the present invention 1 is excellent, which provides excellent handling properties during manufacturing and use of the face mask using the laminated nonwoven fabric of the present invention 1.

The laminated nonwoven fabric of the present invention 1 has the above configuration, whereby the softness and flexibility of the laminated nonwoven fabric during bending and stretching are improved, which provides improved skin following property of the face mask using the laminated nonwoven fabric to the skin surface. By improving the skin following property of the face mask to the skin surface, the peeling of the face mask from the skin surface (including the skin surface of a face portion having large irregularities such as a portion from the nose tip to the cheek) is prevented. That is, the adherence of the face mask to the skin surface is excellent.

It is preferable that the laminated nonwoven fabric of the present invention 1 has wet stiffness of 0.12 mN or more and 0.18 mN or less as measured based on JIS L 1913: 2010.6.7.3, and wet tensile strength of 15 N/25 mm or more and 50 N/25 mm or less as measured based on JIS L 1913: 2010.6.3.2. Hereinafter, the "wet stiffness as measured based on JIS L 1913: 2010.6.7.3" is sometimes merely referred to as "stiffness", and the "wet tensile strength as measured based on JIS L 1913: 2010.6.3.2" is sometimes merely referred to as "tensile strength".

The laminated nonwoven fabric of the present invention 1 has excellent softness during bending and stretching and has also excellent flexibility because both the stiffness and the tensile strength are within a specific range. The above mechanism provides excellent skin following property of the face mask using the laminated nonwoven fabric having excellent softness during bending and stretching and also excellent flexibility, to the skin surface. Since the face mask having excellent skin following property to the skin surface is particularly flexibly taken along a portion where large irregularities of the user's face exist (a portion from the user's nose tip to cheek, and the like), the face mask has excellent adherence to the skin surface.

The stiffness of the laminated nonwoven fabric is more preferably 0.16 mN or less, and still more preferably 0.14 mN or less because the softness of the laminated nonwoven fabric during bending and stretching is more excellent and the skin following property of the face mask using the laminated nonwoven fabric to the skin surface is more excellent. The stiffness is measured based on JIS L 1913: 2010.6.7.3 in a state where a laminated nonwoven fabric test piece is impregnated with distilled water at 20° C. for 10 minutes and the test piece taken out from the distilled water is attached to a Gurley type tester.

The tensile strength of the laminated nonwoven fabric is more preferably 40 N/25 mm or less, and still more preferably 30 N/25 mm or less because the flexibility of the laminated nonwoven fabric is more excellent and the skin following property of the face mask using the laminated nonwoven fabric to the skin surface is more excellent. The tensile strength is measured by impregnating a laminated nonwoven fabric test piece with distilled water at 20° C. for 10 minutes, and attaching the test piece taken out of the distilled water to a Constant speed elongation type tensile testing machine, based on JIS L 1913: 2010.6.3.2.

The basis weight of the laminated nonwoven fabric of the present invention 1 is preferably 30 to 65 g/m$^2$, and the lower limit thereof is more preferably 35 g/m$^2$ or more. Meanwhile, the upper limit thereof is more preferably 60 g/m$^2$ or less. By setting the basis weight to 30 g/m$^2$ or more, excellent handling properties during manufacturing and use of the face mask using the laminated nonwoven fabric of the present invention 1 are provided. Meanwhile, by setting the basis weight to 65 g/m$^2$ or less, more excellent skin following property of the face mask using the laminated nonwoven fabric to the skin surface is provided, which provides more excellent adherence of the face mask to the skin surface.

The thickness of the laminated nonwoven fabric of the present invention 1 is preferably 0.3 to 1.3 mm, and the lower limit thereof is more preferably 0.4 mm or more. Meanwhile, the upper limit thereof is more preferably 1.0 mm or less. When the thickness is 0.3 mm or more, and the basis weight of the laminated nonwoven fabric of the present invention 1 is 30 to 65 g/m$^2$, excessive interlacing of the fibers constituting the laminated nonwoven fabric is prevented, and the tensile strength of the laminated nonwoven fabric mainly decreases, whereby the skin following property of the face mask using the laminated nonwoven fabric to the skin surface is improved. As a result, the adherence of the face mask to the skin surface is more excellent. Meanwhile, when the thickness is 1.3 mm or less and the basis weight of the laminated nonwoven fabric of the present invention 1 is 30 to 65 g/m$^2$, the handling properties of the face mask using the laminated nonwoven fabric are excellent.

In the case where the basis weight of the laminated nonwoven fabric of the present invention 1 is 30 to 65 g/m$^2$ and the thickness of the present invention 1 is 0.3 to 1.3 mm, the nonwoven fabric layer (A) and the nonwoven fabric layer (B) included in the laminated nonwoven fabric of the present invention 1 preferably have the following relationship. The ratio of the thickness of the nonwoven fabric layer (A) to the thickness of the nonwoven fabric layer (B) (the thickness of the nonwoven fabric layer (A)/the thickness of the nonwoven fabric layer (B)) (hereinafter, sometimes referred to as a thickness ratio (A/B)) is preferably 0.05 to 0.67. By setting the thickness ratio (A/B) to 0.05 or more, more excellent adherence of the face mask to the skin surface is provided when the face mask using the laminated nonwoven fabric is used with the nonwoven fabric layer (A) disposed on the skin side, which is preferable. By setting the thickness ratio (A/B) to 0.67 or less, excellent handling properties during manufacturing and use of the face mask using the laminated nonwoven fabric are provided, which is preferable.

The face mask using the laminated nonwoven fabric of the present invention 1 is used in a state where the nonwoven fabric layer (A) including the fiber A is disposed on the user's skin side and the nonwoven fabric layer (B) is disposed on the air side of the nonwoven fabric layer (A), whereby the facial lotion included in the nonwoven fabric layer (B) is attracted to the nonwoven fabric layer (A) side being in contact with the skin surface by the capillary effect of the fiber A included in the nonwoven fabric layer (A) and having an extremely small single fiber diameter. Thus, the facial lotion can be prevented from volatilizing in the air, which can provide improved liquid retention of the face mask. As a result, while the face mask is worn, that is, even after 20 minutes which is a general usage time of the face mask, the facial lotion is held by the face mask. As a result, the adherence of the face mask to the skin surface is excellent. As a method for evaluating the above-mentioned liquid retention, the liquid retention can be evaluated by placing a laminated nonwoven fabric impregnated with a lotion on a simulated skin, and using a facial lotion retention using the value of the initial mass of the lotion held by the laminated nonwoven fabric and the value of the mass of the lotion held by the laminated nonwoven fabric after 20 minutes. From the viewpoint of maintaining the adherence for a long time, the facial lotion retention of the laminated nonwoven fabric after 20 minutes is preferably 70% by mass or more, more preferably 75% by mass or more, and still more preferably 80% by mass or more.

The face mask using the laminated nonwoven fabric of the present invention 1 is used in a state where the nonwoven fabric layer (A) including the fiber A which is an ultrafine fiber is disposed on the user's skin side, whereby the fiber A penetrates into the fine irregularities of the skin surface to increase the contact area between the skin surface and the surface of the nonwoven fabric layer (A). This provides an improved coefficient of friction between the face mask and the skin surface to prevent the face mask from slipping on the skin surface, thereby improving the adherence. As a method for evaluating the coefficient of friction between the face mask and the skin surface, the coefficient of friction may be evaluated by a coefficient of static friction between a laminated nonwoven fabric impregnated with distilled water and a simulated silicon skin surface based on JIS P 8147: 1994 3.2 inclination method. From the viewpoint of the adherence of the face mask to the skin surface, the coefficient of static friction between the nonwoven fabric layer (A) of the laminated nonwoven fabric and the simulated skin surface is preferably 1.5 or more, and more preferably 2.0 or more.

In the laminated nonwoven fabric of the present invention 1, the nonwoven fabric layer (A) includes the fiber A which is an ultrafine fiber, whereby the coefficient of friction between the face mask using the laminated nonwoven fabric and the skin surface is excellent, as described above. In addition, in the laminated nonwoven fabric of the present invention 1, the nonwoven fabric layer (B) includes a specific content of the fiber B having specific wet strength, whereby the skin following property of the face mask using the laminated nonwoven fabric to the skin surface is excellent, as described above. The coefficient of friction between the face mask and the skin surface is excellent, and the skin following property of the face mask to the skin surface is excellent, whereby the adherence of the face mask to the skin surface is excellent. As a method for evaluating the adherence of the face mask to the skin surface, which is exhibited by using the laminated nonwoven fabric obtained by combining the nonwoven fabric layer (A) with the nonwoven fabric layer (B), the adherence can be evaluated by placing a laminated nonwoven fabric impregnated with distilled water on a simulated skin and using the adhesion between the laminated nonwoven fabric and the simulated skin when lifting the laminated nonwoven fabric. The adhesion between the surface of the laminated nonwoven fabric in which the nonwoven fabric layer (A) is arranged as the outermost layer and the simulated silicon skin surface which is the simulated skin, as measured by the above method (hereinafter, the adhesion between the laminated nonwoven fabric and the simulated skin) is preferably 1.20 N or more, more preferably 1.24 N or more, and particularly preferably 1.27 N or more, from the viewpoint that the adhesion feeling when the face mask is worn is favorable.

Here, it is preferable that at least one of the nonwoven fabric layer (A) and the nonwoven fabric layer (B) included in the laminated nonwoven fabric of the present invention 1 is a spunlace nonwoven fabric. The spunlace nonwoven fabric can be obtained by a method for entangling constituent fibers with a high pressure water stream, but the method provides a nonwoven fabric layer having less end breakage of constituent fibers during entangling and higher strength than those of a nonwoven fabric layer obtained by a method for entangling constituent fibers by a needle punch, whereby the handling properties during manufacturing and use of the face mask using the laminated nonwoven fabric can be enhanced.

As a method for obtaining the fiber A used in the laminated nonwoven fabric of the present invention 1 and having a single fiber diameter of 50 nm or more and 800 nm or less, for example, a method described in the section of Example 1 to be described later can be adopted.

The nonwoven fabric layer (A) and the nonwoven fabric layer (B) may be individually entangled with a high pressure water stream, and the nonwoven fabric layer (A) and the nonwoven fabric layer (B) are then laminated and integrated with a high pressure water stream to provide the laminated nonwoven fabric. A web of the nonwoven fabric layer (A) after the carding step (before entangling) and a web of the nonwoven fabric layer (B) are laminated, and entangled and integrated with a high pressure water stream to provide the laminated nonwoven fabric.

The laminated nonwoven fabric of the present invention 1 can be applied to cosmetic material applications, wiping material applications, medical applications, sanitary material applications, and general purpose applications and the like. Applications in which the laminated nonwoven fabric is used in a state where the laminated nonwoven fabric is immersed in a facial lotion or water and the like are preferable. In particular, the laminated nonwoven fabric is preferably applied to a skin care product used in a state where the laminated nonwoven fabric is impregnated with a lotion or a beauty lotion such as a face mask, that is, a cosmetic material.

Hereinafter, an embodiment of the present invention 2 will be described in detail. A laminated nonwoven fabric of the present invention 2 includes a nonwoven fabric layer (A) and a nonwoven fabric layer (B). The nonwoven fabric layer (A) includes a fiber A having a single fiber diameter of 50 nm or more and 800 nm or less. The nonwoven fabric layer (A) is disposed as the outermost layer of at least one surface of the laminated nonwoven fabric. By using the laminated nonwoven fabric so that the nonwoven fabric layer (A) is in contact with a user's skin, the fiber A penetrates into the fine grooves of the skin, which causes a contact area between the nonwoven fabric layer (A) and the skin to increase. As a result, the adherence between the laminated nonwoven fabric and the skin is improved. The single fiber diameter of the fiber A is set to 50 nm or more, which makes it possible to prevent the fiber A from falling off and remaining on the skin when the laminated nonwoven fabric is used for a face mask. Meanwhile, the single fiber diameter of the fiber A is set to 800 nm or less, whereby, as described above, the contact area between the skin and the fiber surface increases, which causes the contact area between the skin and the nonwoven fabric layer (A) to increase. This provides an improved coefficient of friction between the skin and the laminated nonwoven fabric. Therefore, the laminated nonwoven fabric is prevented from slipping on the skin surface, whereby the adherence when the laminated nonwoven fabric is worn can be effectively achieved. Furthermore, the improved adherence makes it possible to prevent the laminated nonwoven fabric from slipping when the cheek is lifted up. As a result, the lift-up property of the face mask using the laminated nonwoven fabric is improved. From the above viewpoint, the upper limit of the single fiber diameter of the fiber A is more preferably 500 nm or less, still more preferably 400 nm or less, and particularly preferably 250 nm or less. From two viewpoints of the improvement of the lift-up property of the laminated nonwoven fabric and the improvement of the productivity of the laminated nonwoven fabric, the single fiber diameter of the fiber A is preferably 100 to 400 nm.

Here, the nonwoven fabric layer (A) is formed from the fiber A, but the nonwoven fabric layer (A) may be formed from only the fiber A. The nonwoven fabric layer (A) may include fibers other than the fiber A (for example, fibers having a single fiber diameter of 1000 nm or more) in a range in which the effect of the present invention 2 is not impaired. Here, the range in which the effect of the present invention 2 is not impaired means a range in which the adhesion of the surface of the laminated nonwoven fabric in which the nonwoven fabric layer (A) is disposed as the outermost layer to a simulated silicon skin surface is 1.20 or more.

The variation of the single fiber diameter of the fiber A which is a nanofiber is 20.0% or less. Since the variation of the single fiber diameter of the fiber A is 20.0% or less, the extremely fine fiber A having a uniform single fiber diameter penetrates into fine irregularities of the skin surface, which prevents voids from being formed between the skin and the surface of the nonwoven fabric layer (A), whereby the contact area between the skin and the nonwoven fabric layer (A) increases. This provides an improved friction coefficient between the laminated nonwoven fabric of the present invention 2 and the skin, whereby the laminated nonwoven fabric is prevented from slipping on the skin surface. As a result, the adherence of the face mask using the laminated nonwoven fabric is improved. Furthermore, when the variation of the single fiber diameter of the fiber A is 20.0% or less, nano-order fine uniform voids are formed between the fibers of the fiber A, whereby liquid retention can be effectively obtained by the capillary effect due to the voids. If the variation of the single fiber diameter exceeds 20.0%, the fiber diameters of some fibers in the fiber A increase, so that the fiber A cannot penetrate into the fine irregularities of the skin surface. This tends to cause deteriorated adherence between the face mask using the laminated nonwoven fabric and the user's skin.

Here, the single fiber diameter of the fiber A is 50 to 400 nm, and the variation of the single fiber diameter of the fiber A is 20.0% or less, whereby the ultrafine fiber A having a uniform single fiber diameter penetrates into the fine irregularities of the skin surface. As a result, the contact area between the skin and the nonwoven fabric layer (A) is very large. Therefore, the adherence of the laminated nonwoven fabric of the present invention 2 to the skin is extremely excellent, whereby one of the most preferable forms which can be taken by the laminated nonwoven fabric of the present invention 2 is provided. It is particularly preferable that the single fiber diameter of the fiber A is 100 to 400 nm, and the variation of the single fiber diameter of the fiber A is 20.0% or less because the above effect is more excellent.

From the above viewpoint, the variation of the single fiber diameter of the fiber A is preferably smaller. The variation is preferably 15.0% or less, more preferably 10.0% or less, and still more preferably 7.0% or less.

The variation of the single fiber diameter of the fiber A is not particularly limited, but it is preferably 1.0% or more.

The variation of the single fiber diameter of the fiber A can be measured by photographing an image with a scanning electron microscope (SEM).

The fiber A may be in a form of individually dispersed single fibers, partially bonded single fibers, or an aggregate of a plurality of single fibers, and the like. That is, regardless of the length or the cross-sectional shape, the fiber A may be in a so-called fibrous form.

As a material of the fiber A used in the present invention 2, thermoplastic resins such as polyester, polyamide, and polyolefin can be used. Among these, in terms of enhancing the above-mentioned adherence and lift-up property, the fiber A is preferably a polyamide resin. By using the polyamide fiber having water absorbability for the fiber A having a single fiber diameter of 50 nm or more and 800 nm or less, a capillary effect of absorbing a facial lotion between the laminated nonwoven fabric and the skin is enhanced. Furthermore, the contact area between the laminated nonwoven fabric and the skin increases, whereby the adherence and lift-up property of the face mask using the laminated nonwoven fabric can be further enhanced. These thermoplastic resins may be polymerized with other components, or may include additives such as a stabilizer.

As the polyamide which can constitute the fiber A, for example, nylon 6, nylon 11, nylon 12, nylon 66, and various aramid resins can be used. Among these, nylon 6 having favorable water absorbability is preferably used.

The basis weight of the nonwoven fabric layer (A) used in the present invention 2 is preferably 3 to 40 $g/m^2$, and the lower limit thereof is more preferably 5 $g/m^2$ or more. Meanwhile, the upper limit thereof is more preferably 25 $g/m^2$ or less, and still more preferably 15 $g/m^2$ or less. By setting the basis weight to 3 $g/m^2$ or more, the adherence is likely to be effectively obtained. Meanwhile, by setting the basis weight to 40 $g/m^2$ or less, the manufacturing loss of an easily soluble polymer occurring in a manufacturing step to be described later can be reduced.

From the viewpoint that the adherence between the user's skin and the laminated nonwoven fabric is excellent, in the laminated nonwoven fabric of the present invention 2, the nonwoven fabric layer (A) is disposed as the outermost layer of at least one surface of the laminated nonwoven fabric. Examples of a specific aspect of the laminated nonwoven fabric include a two-layer laminated structure (nonwoven fabric layer (B)/nonwoven fabric layer (A)) in which the nonwoven fabric layer (A) is disposed on one surface of the nonwoven fabric layer (B) to be described later, and a three-layer laminated structure (nonwoven fabric layer (A)/nonwoven fabric layer (B)/nonwoven fabric layer (A)) in which the nonwoven fabric layer (A) is disposed on each of both surfaces of the nonwoven fabric layer (B).

The laminated nonwoven fabric of the present invention 2 has the nonwoven fabric layer (B) as a constituent element thereof, and the nonwoven fabric layer (B) is formed from a fiber B having a single fiber diameter of 3 μm or more and 100 μm or less. The laminated nonwoven fabric includes the nonwoven fabric layer (B) formed from the fiber B, whereby the strength and lift-up property of the face mask using the laminated nonwoven fabric are excellent. The single fiber diameter of the fiber B is 3 μm or more, whereby the strength of the laminated nonwoven fabric is improved, to prevent the deformation of the face mask itself using the laminated nonwoven fabric when the cheek is lifted up. This provides improved lift-up property of the face mask using the laminated nonwoven fabric. Meanwhile, by setting the single fiber diameter of the fiber B to 100 μm or less, the fiber is prevented from becoming rigid, which provides excellent softness of the laminated nonwoven fabric. This prevents discomfort caused by the hardness of the face mask using the laminated nonwoven fabric during use. From the above viewpoint, the lower limit of the single fiber diameter of the fiber B is more preferably 5 μm or more, and still more preferably 7 μm or more. Meanwhile, the upper limit thereof is more preferably 30 μm or less, and still more preferably 20 μm or less.

As a material of the fiber B used in the present invention 2, synthetic fibers such as a polyester fiber, a polyamide fiber, and a polyolefin fiber, and natural fibers such as pulp, silk, cotton, and rayon can be used. Among these, in terms of enhancing the strength, the fiber B is preferably a polyester fiber. Examples of the polyester fiber include polyethylene terephthalate, polybutylene terephthalate, polytrimethylene terephthalate, and polylactic acid. Among these, polyethylene terephthalate having high strength is preferable.

It is preferable that the nonwoven fabric layer (B) includes the fiber B which is a polyester fiber in an amount of 90% by mass or more based on the total mass of the nonwoven fabric layer (B). If the fiber constituting the nonwoven fabric layer (B) includes a water absorbing fiber having high water absorbability such as nylon and cotton at a certain ratio or more, the laminated nonwoven fabric is impregnated with a facial lotion, and the water absorbing fiber then swells. This may cause impaired strength of the water absorbing fiber, to reduce the strength of the face mask. As a result, when the face mask using the laminated nonwoven fabric lifts up the cheek, the face mask may be deformed, to reduce the lift-up property of the face mask using the laminated nonwoven fabric. Therefore, from the above viewpoint, it is preferable that the nonwoven fabric layer (B) is formed from a polyester fiber having lower water absorbability than that of the above-mentioned water absorbing fiber such as nylon or cotton, that is, the nonwoven fabric layer (B) includes a polyester fiber at a certain ratio or more. Specifically, the nonwoven fabric layer (B) preferably includes 90% by mass or more of the fiber B which is a polyester fiber based on the total mass of the nonwoven fabric layer (B). The nonwoven fabric layer (B) may be formed from only the fiber B, or may include a fiber other than the fiber B (for example, a fiber having a single fiber diameter of 800 nm or less) in a range in which the effect of the present invention 2 is not inhibited. Here, the range in which the effect of the present invention 2 is not inhibited means a range in which 10% tensile stress in the cross direction of the face mask in a wet state is 1.5 N/50 mm or more.

As described above, the polyester fiber has lower water absorbability than that of the water absorbing fiber such as nylon or cotton. The nonwoven fabric layer (B) includes 90% by mass or more of the fiber B which is a polyester fiber based on the total mass of the nonwoven fabric layer (B), whereby the facial lotion penetrating performance of the face mask using the laminated nonwoven fabric of the present invention 2 to the user's skin is excellent. The reason is considered as follows. It is considered that, since the nonwoven fabric layer (A) included in the laminated nonwoven fabric of the present invention 2 is formed from a fiber having a small single fiber diameter, the facial lotion included in the nonwoven fabric layer (B) can be attracted by the capillary effect. It is considered that, since the nonwoven fabric layer (B) includes a large amount of relatively low water absorbing polyester fiber, an effect of attracting the facial lotion included in the nonwoven fabric layer B of the nonwoven fabric layer (A) is more remarkable. This is considered to be because, when the face mask using the laminated nonwoven fabric of the present invention 2 is used, the nonwoven fabric layer (A) is in contact with the user's skin, whereby a large amount of facial lotion included in the nonwoven fabric layer (A) is supplied to the user's skin.

The basis weight of the nonwoven fabric layer (B) of the present invention 2 is preferably 15 to 100 g/m$^2$, and the lower limit thereof is more preferably 20 g/m$^2$ or more. Meanwhile, the upper limit thereof is more preferably 80 g/m$^2$ or less, and still more preferably 60 g/m$^2$ or less. By setting the basis weight to 15 g/m$^2$ or more, the strength of the face mask of the present invention 2 is excellent. Meanwhile, by setting the basis weight to 100 g/m$^2$ or less, the increase in the total mass of the face mask is prevented when laminated with the nonwoven fabric layer (A) to absorb the facial lotion, whereby the unintentional peeling of the face mask from the user's skin can be prevented when the face mask is used.

It is preferable that the face mask of the present invention 2 has certain strength as described above, and the present inventors have found that 10% tensile stress in the cross direction of the face mask in a wet state is 1.5 N/50 mm or more, to provide a face mask which can withstand tensile deformation when the cheek is lifted up. When the user wears the face mask having 10% tensile stress of 1.5 N/50 mm or more in the cross direction of the face mask in a wet state, the cross direction of the face mask is substantially parallel to a direction from the user's cheek to the ear. Therefore, it is presumed that the deformation of the face mask in the cross direction due to pulling up (lift-up) when the face mask is worn is prevented, as a result of which excellent lift-up performance can be more effectively achieved by the face mask. The tensile stress in the cross direction of the face mask in the wet state of the present invention 2 can be measured by reading stress when the face mask is elongated by 10% of the initial length by a constant speed elongation type tensile testing machine based on JIS L 1913. Here, the cross direction of the face mask means a direction substantially perpendicular to a direction from a face mask portion disposed on the user's forehead to a face mask portion disposed on the user's jaw when the face mask is worn. For example, the content of the fiber B included in the nonwoven fabric layer (B) of the face mask of the present invention 2 and the single fiber diameter of the fiber B within a range of 3 to 100 μm are suitably adjusted, whereby desired 10% tensile stress in the cross direction of the face mask in the wet state can be provided.

The face mask of the present invention 2 is used in a state where the nonwoven fabric layer (A) including the fiber A is located on the user's skin side, and the nonwoven fabric layer (B) is located on the air side of the nonwoven fabric layer (A), whereby the facial lotion included in the nonwoven fabric layer (B) is attracted to the nonwoven fabric layer (A) side in contact with the skin by the capillary effect of the fiber A included in the nonwoven fabric layer (A) and having an extremely small single fiber diameter. This makes it possible to prevent the facial lotion from vaporizing in the air, whereby the liquid retention of the face mask can be improved. As a result, while the face mask is worn, that is, even after 20 minutes which is a general usage time of the face mask, the facial lotion is held by the face mask, as a result of which the adherence of the face mask to the skin is excellent. In a method for evaluating the above-mentioned liquid retention, the liquid retention can be evaluated by placing a face mask impregnated with a lotion on a simulated skin, and using a facial lotion retention using the value of the initial mass of the lotion held by the face mask and the value of the mass of the lotion held by the face mask after 20 minutes. From the viewpoint of maintaining the adherence for a long time, the facial lotion retention of the face mask after 20 minutes is preferably 70% or more, more preferably 75% or more, and still more preferably 80% or more.

In the face mask of the present invention 2, the nonwoven fabric layer (A) includes the fiber A having variation of the single fiber diameter of 20.0% or less, whereby the fiber A penetrates into the fine irregularities of the skin surface to increase the contact area between the skin and the surface of the nonwoven fabric layer (A). This provides an improved coefficient of friction between the face mask of the present invention 2 and the skin to prevent the face mask from slipping on the skin surface, consequently improving the adherence. In a method for evaluating the coefficient of friction between the face mask and the skin, the coefficient of friction can be evaluated by a coefficient of static friction when impregnated with distilled water based on JIS P 8147: 1994 3.2 inclination method. From the viewpoint of the adherence, the coefficient of static friction between the nonwoven fabric layer (A) of the face mask and the skin is preferably 1.5 or more, more preferably 2.0 or more, still more preferably 2.4 or more, and particularly preferably 2.7 or more.

In the face mask of the present invention 2, the nonwoven fabric layer (A) includes the fiber A having variation of the single fiber diameter of 20.0% or less, whereby the adsorption effect of face mask can provide improved initial (immediately after wore) adherence of the face mask of the present invention 2. In a method for evaluating the adhesion, the adhesion when a face mask is lifted can be evaluated in a state where the face mask impregnated with distilled water is placed on a simulated skin. The adhesion between the face mask and the skin measured by the above method is preferably 1.20 N or more, more preferably 1.24 N or more, and particularly preferably 1.27 N or more, from the viewpoint of adhesion feeling when worn.

Here, it is preferable that the nonwoven fabric layer (A) or the nonwoven fabric layer (B) included in the face mask of the present invention 2 is a spunlace nonwoven fabric. The spunlace nonwoven fabric can be obtained by a method for entangling constituent fibers with a high pressure water stream, but the method provides a nonwoven fabric layer having less end breakage of constituent fibers during entangling and higher strength than those of a nonwoven fabric layer obtained by a method for entangling constituent fibers by a needle punch, whereby the lift-up property of the face mask can be enhanced.

As a method for obtaining the fiber A of the present invention 2, known methods (for example, a method disclosed in WO 12/173116) can be adopted.

The nonwoven fabric layer (A) and the nonwoven fabric layer (B) may be individually entangled with a high pressure water stream, and the nonwoven fabric layer (A) and the nonwoven fabric layer (B) are then laminated and integrated with a high pressure water stream to provide the laminated nonwoven fabric. A web of the nonwoven fabric layer (A) after the carding step (before entangling) and a web of the nonwoven fabric layer (B) are laminated, and entangled and integrated with a high pressure water stream to provide the laminated nonwoven fabric.

The laminated nonwoven fabric is punched into a face mask shape. The laminated nonwoven fabric is impregnated with a lotion or a beauty lotion, and used for the face mask.

EXAMPLES

Measuring methods used in the present Examples will be described later.

(1) Specification of Nonwoven Fabric Layer (A) and Nonwoven Fabric Layer (B)

A laminated nonwoven fabric was cut perpendicularly to the surface of the laminated nonwoven fabric. A thin section was cut out from the laminated nonwoven fabric, and a Pt—Pd (platinum-palladium) alloy was vacuum-deposited on the cross-section of the thin section to obtain a deposited body. Then, the cross-sectional portion of the deposited body was observed with a scanning electron microscope (SEM) (S-3500N type, manufactured by Hitachi High-Tech Co., Ltd.). The laminated nonwoven fabric was visually confirmed to include a plurality of nonwoven fabric layers including fibers having different single fiber diameters.

Next, with respect to each of the plurality of nonwoven fabric layers, the single fiber diameter and wet strength and the like of the fiber were measured by the methods described in the items of the other measurement methods. Based on these measurement results, the nonwoven fabric layer formed from a fiber having a single fiber diameter of 50 nm or more and 800 nm or less was specified as a nonwoven fabric layer (A). A nonwoven fabric layer formed from a fiber having a single fiber diameter of 3 μm or more and 30 μm or less and including 15 to 40% by mass of a fiber based on all of the fibers constituting the nonwoven fabric layer, the fiber having wet strength of 2.0 cN/dtex or less was specified as a nonwoven fabric layer (B).

(2) Single Fiber Diameter of Fiber Having Single Fiber Diameter of 1000 nm or More A laminated nonwoven fabric was cut perpendicularly to the surface of the laminated nonwoven fabric. A thin section was cut out from the laminated nonwoven fabric, and a Pt—Pd (platinum-palladium) alloy was vacuum-deposited on the cross-section of the thin section to obtain a deposited body. Next, the cross-sectional portion of the nonwoven fabric layer included in the thin section was observed with a scanning electron microscope (SEM) (S-3500N type, manufactured by Hitachi High-Tech Co., Ltd.). Ten points were randomly extracted from the observation range, and a cross-sectional photograph was taken at a magnification of 1,000 times. Then, 10 fibers each having a single fiber diameter of 1000 nm or more were randomly extracted in the same photograph, and single fiber diameters of a total of 100 fibers each having a single fiber diameter of 1000 nm or more were measured. In the case where the fiber having a single fiber diameter of 1000 nm or more had a variant cross-sectional shape, the cross-sectional area of the fiber was measured from the cross-sectional photograph, and the single fiber diameter was converted into a true circle diameter using the cross-sectional area to provide the single fiber diameter of the fiber having a single fiber diameter of 1000 nm or more.

(3) Single Fiber Diameter of Fiber of Single Fiber Diameter of Less than 1000 nm A cross-sectional photograph was taken with a scanning electron microscope (SEM) (SU8010 type, manufactured by Hitachi High-Tech Co., Ltd.) in the same manner as in the method for measuring the single fiber diameter of the fiber of (2) above except that the magnification of the cross-sectional photograph was set to 10,000 times. Then, 10 fibers each having a single fiber diameter of less than 1000 nm were randomly extracted in the same photograph, and the single fiber diameters of a total of 100 fibers each having a single fiber diameter of less than 1000 nm were measured. In the case where the fiber having a single fiber diameter of less than 1000 nm had a variant cross-sectional shape, the cross-sectional area of the fiber was measured from the cross-sectional photograph, and the single fiber diameter was converted into a true circle diameter using the cross-sectional area to provide the single fiber diameter of the fiber having a single fiber diameter of less than 1000 nm.

(4) Average Single Fiber Diameter of Fiber A

The average single fiber diameter of the fiber A included in the nonwoven fabric layer (A) of the laminated nonwoven fabric sample including the nonwoven fabric layer (A) and the nonwoven fabric layer (B) was measured as follows. The cross-sectional portion of the nonwoven fabric layer (A) was observed with a scanning electron microscope (SEM) (SU8010 type, manufactured by Hitachi High-Tech Co., Ltd.). A taken portion was randomly selected from the observed range, and a cross-sectional photograph was taken at a magnification of 1,000 times. Next, 10 fibers each having a single fiber diameter of less than 1000 nm were randomly extracted in the photograph. The single fiber diameters of the fibers were measured, and the fibers corresponding to the fiber A were extracted by measuring the single fiber diameter. The work from the taking of the photograph of the cross-section portion of the nonwoven fabric layer (A) to the extraction of the fiber A was repeated until the total number of the extracted fibers A reached 100. The average value of the single fiber diameters of the 100 fibers A was calculated, and taken as the average single fiber diameter of the fiber A.

(5) Variation of Single Fiber Diameter of Fiber A

The variation of the single fiber diameter of the fiber A included in the nonwoven fabric layer (A) of the laminated nonwoven fabric sample including the nonwoven fabric layer (A) and the nonwoven fabric layer (B) was measured as follows. The cross-sectional portion of the nonwoven fabric layer (A) was observed with a scanning electron microscope (SEM) (SU8010 type, manufactured by Hitachi High-Tech Co., Ltd.). A taken portion was randomly selected from the observed range, and a cross-sectional photograph was taken at a magnification of 1,000 times. Next, 10 fibers each having a single fiber diameter of less than 1000 nm were randomly extracted in the photograph. The single fiber diameters of the fibers were measured, and the fibers corresponding to the fiber A were extracted by measuring the single fiber diameter. The work from the taking of the photograph of the cross-section portion of the nonwoven fabric layer (A) to the extraction of the fiber A was repeated until the total number of the extracted fibers A reached 100. The variation of the single fiber diameter of the fiber A was calculated according to the following equation using the values of the single fiber diameters of the 100 fibers A.

Variation of single fiber diameter of fiber A (single fiber diameter CV % of fiber A)=(standard deviation of single fiber diameter of fiber A/average value of single fiber diameter of fiber A)×100(%)

(6) Tensile Strength of Fiber

The wet strength of the fiber was measured based on JIS L 1015: 2010 8.7.2.

Specifically, one fiber was collected from the laminated nonwoven fabric sample. Next, the fiber was immersed in water for 2 minutes, and tensile strength was then measured in water in a state where the fiber was attached to a constant speed elongation type tensile testing machine. A gripping distance was set to 10 mm, and a load was applied at a tensile speed of 10 mm/min until the sample was cut. Strength at that time was measured, and the measurement result was taken as tensile strength measured based on JIS L 1015: 2010 8.7.2 of the fiber.

(7) Content of Fiber B1 Having Wet Strength of 2.0 cN/Dtex or Less Based on all of Fibers Constituting Nonwoven Fabric Layer (B)

Among the plurality of nonwoven fabric layers included in the laminated nonwoven fabric, 100 fibers constituting the nonwoven fabric layer were randomly selected for the nonwoven fabric layer formed from the fiber having a single fiber diameter of 3 µm or more and 30 µm or less.

Next, with respect to these fibers, the wet strength of the fiber was measured by the measurement method described in the section "(6) Wet Strength of Fiber".

Furthermore, the total value of the masses of the 100 fibers was taken as a mass A, and the total value of the masses of fibers having wet strength of 2.0 cN/dtex or less among the 100 fibers was taken as a mass B. The mass B was divided by the mass A. The obtained value was multiplied by 100, and the obtained value was taken as the content of the fiber B1 having wet strength of 2.0 cN/dtex or less based on all of the fibers constituting the nonwoven fabric layer (B).

(8) Contents of Regenerated Fiber, Semi-Synthetic Fiber, and Animal Natural Fiber Included in Laminated Nonwoven Fabric Based on JIS L 1030-1: 2006 "Method for Testing Mixing Ratio of Fiber Product-Part 1:Differentiation of Fiber" and JIS L 1030-2: 2005 "Method for Testing Mixing Ratio of Fiber Product-Part 2:Fiber Mixing Ratio", the corrected weight mixing ratios (mass ratio of each fiber in a standard state) in the laminated nonwoven fabric, of the regenerated fiber, semi-synthetic fiber, and animal natural fiber included in the laminated nonwoven fabric were measured, and taken as the contents (% by mass) of the regenerated fiber, semi-synthetic fiber, and animal natural fiber included in the laminated nonwoven fabric with respect to the entire laminated nonwoven fabric.

(9) Basis Weight

The basis weight was measured based on JIS L 1913: 1998 6.2.

Ten 50 mm×50 mm test pieces were collected from the laminated nonwoven fabric sample using a steel ruler and a razor blade. The masses of the test pieces in the standard state were measured. The mass per unit area was determined according to the following equation, and the average value thereof was calculated.

$$ms = m/S$$

Here, ms: mass per unit area (g/m$^2$)
  m: average weight of test piece (g)
  S: area of test piece (m$^2$).

(10) Thickness

The thickness was measured based on JIS L 1913: 1998 6.1.2 A method.

From the laminated nonwoven fabric sample, five 50 mm×50 mm test pieces were collected. The thickness was measured in a state where a pressure of 0.36 kPa was applied to the test piece in a standard state for 10 seconds using a thickness measuring instrument (constant pressure thickness measuring instrument, type PG11J, manufactured by TECLOCK). The measurement was performed for each of the test pieces (five test pieces), and the average value thereof was calculated.

(11) Thickness Ratio of Nonwoven Fabric Layer (A) and Nonwoven Fabric Layer (B) (A/B)

With respect to the laminated nonwoven fabric sample including the nonwoven fabric layer (A) and the nonwoven fabric layer (B), the thicknesses of the nonwoven fabric layer (A) and the nonwoven fabric layer (B) were measured as follows. The cross-sectional portion of the laminated nonwoven fabric was observed with a scanning electron microscope (SEM) (S-3500N type, manufactured by Hitachi High-Tech Co., Ltd.), and a total of 10 cross-sectional photographs were taken at a magnification of 100 times. Next, the thickness of the nonwoven fabric layer (A) was randomly measured at ten points in each photograph. The work was performed on 10 cross-sectional photographs, and the average value of a total of 100 values was taken as the thickness A of the nonwoven fabric layer (A). The thickness of the nonwoven fabric layer (B) was randomly measured at ten points in each photograph. The work was performed on 10 cross-sectional photographs, and the average value of a total of 100 values was taken as the thickness B of the nonwoven fabric layer (B). When the nonwoven fabric configuration was the nonwoven fabric layer (A)/nonwoven fabric layer (B), the thickness ratio of the nonwoven fabric layer (A) and the nonwoven fabric layer (B) was calculated as A/B using the obtained average value. When the laminated nonwoven fabric in the nonwoven fabric configuration includes a plurality of nonwoven fabric layers (A) such as nonwoven fabric layer (A)/nonwoven fabric layer (B)/nonwoven fabric layer (A), the thickness ratio of the nonwoven fabric layer (A) and the nonwoven fabric layer (B) was calculated as A'/B using the average value (A') of sum values measured for the nonwoven fabric layers (A).

(12) Stiffness

The stiffness was measured based on JIS L 1913: 2010.6.7.3.

Ten test pieces each having a predetermined size described in the above-mentioned JIS were collected from the laminated nonwoven fabric sample. Next, five of the ten test pieces were subjected to evaluation of stiffness in the direction of travel of a laminated nonwoven fabric manufacturing apparatus. Five of the ten test pieces were subjected to evaluation of stiffness in a direction perpendicular to the direction of travel of a laminated nonwoven fabric manufacturing apparatus. Specifically, the test piece was impregnated in 100 mL of distilled water (water temperature: 20° C.) for 10 minutes. Next, the test piece was taken out of the distilled water, and the test piece was attached to a Gurley type tester (Toyo Seiki Seisaku-sho Ltd., "Gurley flexibility tester") in a state where the distilled water dripped from the test piece, to measure the stiffness (mN). The average stiffness of the obtained ten test pieces was taken as the stiffness of the laminated nonwoven fabric.

(13) Tensile Strength

The tensile strength was measured based on JIS L 1913: 2010.6.3.2.

From the laminated nonwoven fabric sample, there were prepared five test pieces each having a width of 25 mm and a length of 150 mm so that the direction perpendicular to the direction of travel of the laminated nonwoven fabric manufacturing apparatus was set to a longitudinal direction. The test piece was impregnated in 100 mL of distilled water (water temperature: 20° C.) for 10 minutes, and the test piece was then taken out from the distilled water. Then, the test piece was promptly attached to a constant speed elongation type tensile testing machine (Shimadzu Corporation, "AG-50kNG") for measuring the tensile strength. A load was applied until the test piece was cut at a tension speed of 200 mm/min, with a gripping distance in the length direction of the test piece set to 100 mm, and the maximum stress when the test piece was broken was read from a stress-strain curve. The average value of a total of five measured values was taken as the tensile strength.

(14) Coefficient of Static Friction

The coefficient of static friction was measured based on JIS P 8147: 1994 3.2 inclination method.

From the laminated nonwoven fabric sample, there were prepared ten test pieces each having a width of 30 mm and a length of 130 mm (the laminated nonwoven fabric including the nonwoven fabric layer (A) and the nonwoven fabric layer (B)). Next, five of the ten test pieces were subjected to evaluation of a coefficient of static friction in the direction of travel of a laminated nonwoven fabric manufacturing apparatus. Five of the ten test pieces were subjected to evaluation of a coefficient of static friction in a direction perpendicular to the direction of travel of the laminated nonwoven fabric manufacturing apparatus. Specifically, with respect to the evaluation of the direction of travel, the test piece was impregnated in 100 mL of distilled water (water temperature: 20° C.) for 10 minutes. The test piece was taken out of the distilled water, and then promptly attached to the weight of a slip angle measuring apparatus. Meanwhile, a silicon simulated skin surface ("Bioskin plate", manufactured by Beaulax, size: 195 mm×130 mm×5T mm, hardness: Lv 2) was attached to the slip angle measuring apparatus. A weight to which the test piece was attached was placed on the silicon simulated skin surface so that a measurement surface of the test piece was in contact with the silicon simulated skin surface, and the direction of travel of the test piece coincides with the sliding direction of the slip angle measuring apparatus. An inclination angle when the weight was dropped was read under the condition of an inclination angle of less than 3°/sec, and the tangent (tan θ) of the inclination angle was taken as the coefficient of static friction. With respect to the evaluation in the direction perpendicular to the direction of travel, the test piece was impregnated in 100 mL distilled water (water temperature: 20° C.) for 10 minutes. The test piece was taken out, and rapidly attached to the weight of the slip angle measuring apparatus. Meanwhile, the silicon simulated skin surface was attached to the slip angle measuring apparatus. The weight to which the test piece was attached was placed on the silicon simulated skin surface so that the measurement surface of the test piece was in contact with the silicon simulated skin surface, and the direction perpendicular to the direction of travel of the test piece coincides with the sliding direction of the slip angle measuring apparatus. An inclination angle when the weight was dropped was read under the condition of an inclination angle of less than 3°/sec, and the tangent (tan θ) of the inclination angle was taken as the coefficient of static friction. The average value of the coefficients of static friction of the obtained ten test pieces was taken as the coefficient of static friction of the laminated nonwoven fabric.

(15) Mass Retention of Lotion

From the laminated nonwoven fabric sample of which the humidity was controlled for 24 hours under an atmosphere of a temperature of 20° C. and a humidity of 60% RH, five laminated nonwoven fabric test pieces each having a width of 25 mm and a length of 25 mm were collected. The mass (g) of the test piece was then measured. The mass (g) of the silicon simulated skin surface ("cheek portion skin model: 40's", size: p 50 mm×5T mm, manufactured by Beaulax) was measured. The test piece was placed on the silicon simulated skin surface, and a lotion (Mujirushi Ryohin, "Lotion/Moist Type for Sensitive Skin" (registered trademark), RYOHIN KEIKAKU CO., LTD.) was impregnated in the test piece so that the mass of the lotion was seven times the mass of the test piece. In this state, the initial total mass (g) of the test piece, the simulated silicon skin surface, and the lotion was measured. These were introduced into a constant temperature and humidity bath at a temperature of 20° C. and a humidity of 60% RH. After 20 minutes, the sample was taken out. The total mass (g) of the test piece, the simulated silicon skin surface, and the lotion after 20 minutes was measured, and the facial lotion retention (%) was calculated according to the following equation. The measurement was performed for 5 samples. The average value thereof was calculated, and taken as the mass retention of the lotion.

Initial mass of lotion (g)=initial total mass (g)−mass of silicon simulated skin surface (g)−mass of test piece (g)

Mass of lotion after 20 minutes (g)=total mass after 20 minutes (g)−mass of silicon simulated skin surface (g)−mass of test piece (g)

Mass retention of lotion (%)=mass of lotion after 20 minutes (g)/Initial mass of lotion (g)×100.

(16) Adhesion

Ten laminated nonwoven fabric test pieces each having a width of 60 mm and a length of 60 mm were collected. A sewing thread was made to penetrate through the center of the test piece (intersection of diagonal lines), and the end portions of the sewing thread were tied so as to form a ring having a circumferential length of 300 mm. The test piece was immersed in 100 mL of distilled water (water temperature: 20° C.) for 10 minutes, taken out, and immediately placed on the simulated silicon skin surface (manufactured by Beaulax, "Bioskin plate", size: 195 mm×130 mm×5T mm, hardness: Lv2) so that the surface of the nonwoven fabric layer (A) of the test piece was in contact with the simulated silicon skin surface. The sewing thread was grabbed with a chuck of the constant speed elongation type tensile testing machine so that the sewing thread was perpendicular to the simulated silicon skin surface. The distance between the simulated silicon skin surface and the chuck at this time was adjusted to 100 mm. Then, a load was applied at a tensile speed of 100 mm/min until the entire area of the test piece was peeled off from the simulated silicon skin surface, and the maximum stress at this time was read from a stress-strain curve. The measurement was performed for ten test pieces, and the average value thereof was calculated.

(17) Method for Washing Commercially Available Face Mask

In the case where the measurement described in the present Example is performed using a commercially available face mask, the previously impregnated facial lotion can be washed and removed for the measurement. Specifically, a commercially available face mask is introduced into 1 L of distilled water (water temperature: 20° C.), and repeatedly pressed for 5 minutes with the bellies of fingers, to wash out the previously impregnated facial lotion. After 5 times of the work, the face mask is carefully taken out of the distilled water, and held in a spread Kimtowel (Nippon Paper CRECIA Co., Ltd./stack of 4 sheets) and the like. These are lightly held with the palm, and then left in a state where the Kimtowel is spread on a flat place. Humidity conditioning is performed for 24 hours in an atmosphere of a temperature of 20° C. and a humidity of 60% RH. The face mask after the humidity conditioning can be cut into a predetermined size for each measurement.

(18) Monitor Evaluation (Reference Information)

In order to obtain reference information, the face mask using the laminated nonwoven fabric was subjected to monitor evaluation.

The laminated nonwoven fabric obtained in each of Examples and Comparative Examples was punched into a mask shape to prepare a face mask. A lotion (Mujirushi Ryohin, "Lotion/Moist Type for Sensitive Skin" (registered trademark), RYOHIN KEIKAKU CO., LTD.) was impregnated in the face mask so that the mass of the lotion was seven times the mass of the face mask. Adhesion feeling when the mimic muscle was moved, and handling properties when the face mask was worn were evaluated on a scale of one to ten according to the absolute evaluation of each of 10 female panels, and evaluated according to the following criteria from the average score of the 10 female panels (the decimal places were rounded off).

A+: score 9-10
A: score 7-8
B: score 5-6
C: score 3-4
D: score 0-2.

(19) 10% Tensile Stress of Laminated Nonwoven Fabric in Wet State

The 10% tensile stress was measured based on JIS L 1913: 1998 6.3.2. A laminated nonwoven fabric test piece having a width of 50 mm and a length of 250 mm was cut out from the laminated nonwoven fabric so that the length direction of the test piece was set to the cross direction of the laminated nonwoven fabric, and 5 test pieces were prepared. These test pieces were immersed in distilled water at 20° C. for 10 minutes or more. The test pieces were taken out, and promptly attached to a constant speed elongation type tensile testing machine for measurement. A load was applied until the test piece was cut at a tension speed of 200 mm/min, with a gripping distance set to 100 mm, and the stress when the test piece was elongated by 10 mm was read from a stress-strain curve. The average value of the stresses of the obtained five test pieces was taken as 10% tensile stress in the cross direction of the laminated nonwoven fabric in the wet state. Here, the cross direction of the laminated nonwoven fabric, as described above, means a direction substantially parallel to a direction perpendicular to a direction from a face mask portion disposed on a wearer's forehead to a face mask portion disposed on a wearer's jaw when the face mask using the laminated nonwoven fabric is worn.

(20) Monitor Evaluation (Reference Information)

The nonwoven fabric obtained in each of Examples and Comparative Examples was punched into a mask shape to prepare a face mask. A lotion (Mujirushi Ryohin, "Lotion/Moist Type for Sensitive Skin") was impregnated in the face mask so that the mass of the lotion was seven times the mass of the face mask. Adhesion feeling and lift-up feeling after 20 minutes from wearing were evaluated on a scale of one to ten according to the absolute evaluation of each of 10 female panels, and evaluated according to the following criteria from the average score of the 10 female panels (the decimal places were rounded off).

A: score 9-10
B: score 7-8
C: score 5-6
D: score 3-4
E: score 0-2.

First, Examples of the present invention 1 and Comparative Examples will be described.

Example 1

(Polymer Alloy Fiber)

Nylon 6 having a melt viscosity of 212 Pa·s (262° C., shear rate: 121.6 sec$^{-1}$) and a melting point of 220° C. (N6) (40% by mass), and poly L-lactic acid having a weight average molecular weight of 120,000, a melt viscosity of 30 Pa·s (240° C., shear rate: 2432 sec$^{-1}$), a melting point of 170° C., and an optical purity of 99.5% or more (60% by mass) were separately weighed, and separately supplied into a twin screw extrusion kneader to be described in detail later, followed by kneading at 220° C. to obtain a polymer alloy chip.

Screw shape: Same direction complete meshing type double-thread screw

Screw: diameter: 37 mm, effective length: 1670 mm, L/D=45.1

Kneading section length: 28% of screw effectiveness

A kneading section was positioned on a discharge side by ⅓ of a screw effective length.

Three backflow sections were present on the way.

Bent: 2 places

The obtained polymer alloy chip was supplied into a single-screw extrusion type melting apparatus for a staple spinning machine, to perform melt spinning at a melt temperature of 235° C., a spinning temperature of 235° C. (spinneret surface temperature: 220° C.), and a spinning speed of 1200 m/min, thereby obtaining a polymer alloy fiber. This was subjected to multiple winding, and then subjected to steam drawing, to obtain a tow including a polymer alloy fiber having a single yarn fineness of 3.0 dtex. The obtained polymer alloy fiber exhibited excellent properties: strength of 3.5 cN/dtex, a degree of elongation of 45%, and U %=1.0%.

(Crimping-Cutting Step)

The tow including the polymer alloy fiber was crimped (12 crimps/25 mm), and then cut into a 51 mm short fiber.

(Nonwoven Fabric Layer (A))

The polymer alloy fiber was opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric layer (A) of 18 g/m$^2$.

(Nonwoven Fabric Layer (B))

15% of a rayon fiber (single fiber diameter: 7 μm, wet strength: 0.9 cN/dtex, cut length 38 mm), and 85% of a polyethylene terephthalate (PET) fiber (single fiber diameter: 12 µm, wet strength: 4.3 cN/dtex, cut length: 51 mm) were mixed and opened by a carding machine, and the opened fibers were then made into a web by a crosslap webber. The web was entangled with a high pressure water stream under conditions of a pressure of 3 MPa and a velocity of 1.0 m/min, to obtain a nonwoven fabric layer (B) of 40 g/m$^2$.

(Laminated Nonwoven Fabric)

The nonwoven fabric layer (A) was disposed on each of the front and back surfaces of the nonwoven fabric layer (B) obtained above, to obtain a nonwoven fabric configuration of A/B/A. Furthermore, the layers were entangled with a high pressure water stream under conditions of a pressure of 10 MPa and a velocity of 1.0 m/min, to obtain a laminated nonwoven fabric having a basis weight of 76 g/m$^2$. Next, the laminated nonwoven fabric was treated with a 1% aqueous sodium hydroxide solution at a temperature of 95° C. and a bath ratio of 1:40 for a treatment time of 30 minutes, to remove a sea component of an ultrafine fiber cut fiber included in the nonwoven fabric layer (A), thereby obtaining a laminated nonwoven fabric layer having a basis weight of 54.5 g/m$^2$. The single fiber diameter of a fiber A included in the nonwoven fabric layer (A) was 230 nm. A thickness ratio (A/B) of the nonwoven fabric layer (A) and the nonwoven fabric layer (B) was 0.25. The variation of the single fiber diameter of the fiber A included in the nonwoven fabric layer (A) was 30.0%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had relatively low stiffness and tensile strength, and relatively high adhesion. When the face mask using the laminated nonwoven fabric was subjected to monitor evaluation as reference information, favorable results of adhesion feeling: B and handling properties: A were provided.

Example 2

A laminated nonwoven fabric having a basis weight of 54.2 g/m$^2$ was obtained in the same manner as in Example 1 except that the content rate of the rayon fiber (single fiber diameter: 7 µm, wet strength: 0.9 cN/dtex, cut length: 38 mm) included in the nonwoven fabric layer (B) of Example 1 was changed to 30%, and the content rate of the PET fiber (single fiber diameter: 12 µm, wet strength: 4.3 cN/dtex, cut length: 51 mm) was changed to 70%. A thickness ratio (A/B) of the nonwoven fabric layer (A) and the nonwoven fabric layer (B) was 0.25. The variation of the single fiber diameter of the fiber A included in the nonwoven fabric layer (A) was 31.4%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had low stiffness and tensile strength, and high adhesion. When the face mask using the laminated nonwoven fabric was subjected to monitor evaluation as reference information, very favorable results of adhesion feeling: A+ and handling properties: A were provided.

Example 3

A laminated nonwoven fabric having a basis weight of 54.0 g/m$^2$ was obtained in the same manner as in Example 1 except that the content rate of the rayon fiber (single fiber diameter: 7 µm, wet strength: 0.9 cN/dtex, cut length: 38 mm) included in the nonwoven fabric layer (B) of Example 1 was changed to 40%, and the content rate of the PET fiber (single fiber diameter: 12 µm, wet strength: 4.3 cN/dtex, cut length: 51 mm) was changed to 60%. The thickness ratio (A/B) of the nonwoven fabric layer (A) and the nonwoven fabric layer (B) was 0.19. The variation of the single fiber diameter of a fiber A included in the nonwoven fabric layer (A) was 32.1%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had low stiffness and tensile strength, and high adhesion. When the face mask using the laminated nonwoven fabric was subjected to monitor evaluation as reference information, very favorable results of adhesion feeling: A+ and handling properties: A were provided.

Example 4

A laminated nonwoven fabric having a basis weight of 54.1 g/m$^2$ was obtained in the same manner as in Example 2 except that the rayon fiber (single fiber diameter: 7 µm, wet strength: 0.9 cN/dtex, cut length: 38 mm) included in the nonwoven fabric layer (B) of Example 2 was changed to a rayon fiber (single fiber diameter: 12 µm, wet strength: 1.2 cN/dtex, cut length: 38 mm). The thickness ratio (A/B) of the nonwoven fabric layer (A) and the nonwoven fabric layer (B) was 0.14. The variation of the single fiber diameter of a fiber A included in the nonwoven fabric layer (A) was 32.0%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had relatively low stiffness and tensile strength, and relatively high adhesion. When the face mask using the laminated nonwoven fabric was subjected to monitor evaluation as reference information, favorable results of adhesion feeling: A and handling properties: A were provided.

Example 5

A laminated nonwoven fabric having a basis weight of 54.4 g/m$^2$ was obtained in the same manner as in Example 6 except that the content rate of the rayon fiber (single fiber diameter: 12 µm, wet strength: 1.2 cN/dtex, cut length: 38 mm) included in the nonwoven fabric layer (B) of Example 4 was changed to 20%, and the content rate of the PET fiber (single fiber diameter: 12 µm, wet strength: 4.3 cN/dtex, cut length: 51 mm) was changed to 80%. The thickness ratio (A/B) of the nonwoven fabric layer (A) and the nonwoven fabric layer (B) was 0.11. The variation of the single fiber diameter of a fiber A included in the nonwoven fabric layer (A) was 32.2%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had relatively low stiffness and tensile strength, and relatively high adhesion. When the face mask using the laminated nonwoven fabric was subjected to monitor evaluation as reference information, favorable results of adhesion feeling: A and handling properties: A were provided.

Example 6

A laminated nonwoven fabric having a basis weight of 54.7 g/m² was obtained in the same manner as in Example 2 except that the rayon fiber (single fiber diameter: 7 μm, wet strength: 0.9 cN/dtex, cut length: 38 mm) included in the nonwoven fabric layer (B) of Example 2 was changed to a rayon fiber (single fiber diameter: 15 μm, wet strength: 1.6 cN/dtex, cut length: 38 mm). The thickness ratio (A/B) of the nonwoven fabric layer (A) and the nonwoven fabric layer (B) was 0.11. The variation of the single fiber diameter of a fiber A included in the nonwoven fabric layer (A) was 30.6%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had relatively low stiffness and tensile strength, and relatively high adhesion. When the face mask using the laminated nonwoven fabric was subjected to monitor evaluation as reference information, relatively favorable results of adhesion feeling: B and handling properties: A were provided.

Example 7

A laminated nonwoven fabric having a basis weight of 54.6 g/m² was obtained in the same manner as in Example 2 except that the rayon fiber (single fiber diameter: 7 μm, wet strength: 0.9 cN/dtex, cut length: 38 mm) included in the nonwoven fabric layer (B) of Example 2 was changed to a rayon fiber (single fiber diameter: 17 μm, wet strength: 1.8 cN/dtex, cut length: 38 mm). The thickness ratio (A/B) of the nonwoven fabric layer (A) and the nonwoven fabric layer (B) was 0.14. The variation of the single fiber diameter of a fiber A included in the nonwoven fabric layer (A) was 30.4%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had relatively low stiffness and tensile strength, and relatively high adhesion. When the face mask using the laminated nonwoven fabric was subjected to monitor evaluation as reference information, relatively favorable results of adhesion feeling: B and handling properties: A were provided.

Example 8

(Sea-Island Type Conjugate Fiber)
Nylon 6 (N6, melt viscosity: 190 Pa·s) was used for an island component, and PET copolymerized with 8.0 mol % of 5-sodium sulfoisophthalic acid (copolymerized PET, melt viscosity: 95 Pa·s) was used for a sea component. A known pipe type sea-island composite spinneret (known pipe type sea-island composite spinneret described in Japanese Patent laid-Open Publication No. 2001-192924) was incorporated. The sea and island components were flowed into a spinning pack using a distribution plate in which 1000 distribution holes were formed for island component per one discharge hole so that the composite ratio of the sea and island components was set to 50/50, and a composite polymer stream was discharged from discharge holes to perform melt spinning, thereby obtaining an undrawn fiber. This was drawn at a drawing speed of 800 m/min to obtain sea-island type conjugate fibers of 217 dtex-100 filaments. The obtained sea-island type conjugate fiber exhibited excellent properties: strength of 3.4 cN/dtex, and a degree of elongation of 38%.

(Crimping-Cutting Step)
The filament including the sea-island type conjugate fiber was crimped (12 crimps/25 mm), and then cut into 51 mm short fibers.

(Nonwoven Fabric Layer (A))
The sea-island type conjugate fiber was opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric layer (A) of 14 g/m².

(Nonwoven Fabric Layer (B))
40% of a rayon fiber (single fiber diameter: 7 μm, wet strength: 0.9 cN/dtex, cut length: 38 mm), and 60% of a polyethylene terephthalate (PET) fiber (single fiber diameter: 12 μm, wet strength: 4.3 cN/dtex, cut length: 51 mm) were mixed and opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric layer (B) of 40 g/m².

(Laminated Nonwoven Fabric)
The nonwoven fabric layer (A) was disposed on each of the front and back surfaces of the nonwoven fabric layer (B) obtained above, to obtain a nonwoven fabric configuration of A/B/A. Furthermore, the layers were entangled with a high pressure water stream under conditions of a pressure of 10 MPa and a velocity of 1.0 m/min, to obtain a laminated nonwoven fabric having a basis weight of 69 g/m². Next, the laminated nonwoven fabric was treated with a 1% aqueous sodium hydroxide solution at a temperature of 95° C. and a bath ratio of 1:40 for a treatment time of 30 minutes, to remove a sea component of an ultrafine fiber cut fiber included in the nonwoven fabric layer (A), thereby obtaining a laminated nonwoven fabric layer having a basis weight of 54.0 g/m². The single fiber diameter of a fiber A included in the nonwoven fabric layer (A) was 230 nm. The thickness ratio (A/B) of the nonwoven fabric layer (A) and the nonwoven fabric layer (B) was 0.16. The variation of the single fiber diameter of the fiber A included in the nonwoven fabric layer (A) was 26.0%.

Next, the laminated nonwoven fabric was punched into a mask shape to prepare a face mask. The nonwoven fabric configurations of the laminated nonwoven fabric of the present Example were summarized in Table 1, and the physical properties and the like of the laminated nonwoven fabric were summarized in Table 2. The laminated nonwoven fabric had low stiffness and tensile strength, and high adhesion. When the face mask using the laminated nonwoven fabric was subjected to monitor evaluation as reference information, very favorable results of adhesion feeling: A+ and handling properties: A were provided.

Example 9

(Sea-Island Type Conjugate Fiber)

Nylon 6 (N6, melt viscosity: 190 Pa·s) as an island component, and PET copolymerized with 8.0 mol % of 5-sodium sulfoisophthalic acid (copolymerized PET, melt viscosity: 95 Pa·s) as a sea component were separately melted at 270° C., and then weighed. A known composite spinneret (for example, a composite spinneret having arrangement disclosed in FIG. 6 (a) of WO 12/173116) was incorporated. The sea and island components were flowed into a spinning pack using a distribution plate in which 3000 distribution holes were formed for island component per one discharge hole so that the composite ratio of the sea and island components was set to 50/50, and a composite polymer stream was discharged from discharge holes to perform melt spinning, thereby obtaining an undrawn fiber. This was drawn at a drawing speed of 800 m/min to obtain sea-island type conjugate fibers of 217 dtex-100 filaments. The obtained sea-island type conjugate fiber exhibited excellent properties: strength of 3.5 cN/dtex, and a degree of elongation of 34%.

(Crimping-Cutting Step)

The filament including the sea-island type conjugate fiber was crimped (12 crimps/25 mm), and then cut into 51 mm short fibers.

(Nonwoven Fabric Layer (A))

The sea-island type conjugate fiber was opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric layer (A) of 14 g/m$^2$.

(Nonwoven Fabric Layer (B))

40% of a rayon fiber (single fiber diameter: 7 μm, wet strength: 0.9 cN/dtex, cut length: 38 mm), and 60% of a polyethylene terephthalate (PET) fiber (single fiber diameter: 12 μm, wet strength: 4.3 cN/dtex, cut length: 51 mm) were mixed and opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric layer (B) of 40 g/m$^2$.

(Laminated Nonwoven Fabric)

The nonwoven fabric layer (A) was disposed on each of the front and back surfaces of the nonwoven fabric layer (B) obtained above, to obtain a nonwoven fabric configuration of A/B/A. Furthermore, the layers were entangled with a high pressure water stream under conditions of a pressure of 10 MPa and a velocity of 1.0 m/min, to obtain a laminated nonwoven fabric having a basis weight of 69 g/m$^2$. Next, the laminated nonwoven fabric was treated with a 1% aqueous sodium hydroxide solution at a temperature of 95° C. and a bath ratio of 1:40 for a treatment time of 30 minutes, to remove a sea component of an ultrafine fiber cut fiber included in the nonwoven fabric layer (A), thereby obtaining a laminated nonwoven fabric layer having a basis weight of 54.2 g/m$^2$. The single fiber diameter of a fiber A included in the nonwoven fabric layer (A) was 230 nm. The thickness ratio (A/B) of the nonwoven fabric layer (A) and the nonwoven fabric layer (B) was 0.19. The variation of the single fiber diameter of the fiber A included in the nonwoven fabric layer (A) was 15.1%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had low stiffness and tensile strength, and high adhesion. When the face mask using the laminated nonwoven fabric was subjected to monitor evaluation as reference information, very favorable results of adhesion feeling: A+ and handling properties: A were provided.

Example 10

A laminated nonwoven fabric having a basis weight of 54.2 g/m$^2$ was obtained in the same manner as in Example 8 except that the composite ratio of the sea and island components of Example 8 was set to 85/15. The single fiber diameter of a fiber A included in the nonwoven fabric layer (A) was 230 nm. The thickness ratio (A/B) of the nonwoven fabric layer (A) and the nonwoven fabric layer (B) was 0.19. The variation of the single fiber diameter of the fiber A included in the nonwoven fabric layer (A) was 9.8%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had low stiffness and tensile strength, and high adhesion. When the face mask using the laminated nonwoven fabric was subjected to monitor evaluation as reference information, very favorable results of adhesion feeling: A+ and handling properties: A were provided.

Example 11

A laminated nonwoven fabric layer having a basis weight of 54.1 g/m$^2$ was obtained in the same manner as in Example 8 except that the arrangement pattern of distribution plate holes was a known arrangement pattern (for example, an arrangement pattern disclosed in FIG. 6 (b) of WO 12/173116); a distribution plate in which 1000 distribution holes were formed for island component per one discharge hole was used; and the composite ratio of sea and island components was changed to 20/80. The single fiber diameter of a fiber A included in the nonwoven fabric layer (A) was 230 nm. The thickness ratio (A/B) of the nonwoven fabric layer (A) and the nonwoven fabric layer (B) was 0.14. The variation of the single fiber diameter of the fiber A included in the nonwoven fabric layer (A) was 6.5%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had low stiffness and tensile strength, and high adhesion. When the face mask using the laminated nonwoven fabric was subjected to monitor evaluation as reference information, very favorable results of adhesion feeling: A+ and handling properties: A were provided.

Example 12

A laminated nonwoven fabric layer having a basis weight of 54.2 g/m$^2$ was obtained in the same manner as in Example 11 except that the single fiber diameter of the fiber A included in the nonwoven fabric layer (A) of Example 11 was changed to 300 nm. The thickness ratio (A/B) of the nonwoven fabric layer (A) and the nonwoven fabric layer (B) was 0.19. The variation of the single fiber diameter of the fiber A included in the nonwoven fabric layer (A) was 4.1%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had low stiffness and tensile strength, and high adhesion. When the face mask using the laminated nonwoven fabric was subjected to monitor evaluation as reference information, favorable results of adhesion feeling: A and handling properties: A were provided.

Example 13

A laminated nonwoven fabric having a basis weight of 54.0 g/m² was obtained in the same manner as in Example 11 except that the single fiber diameter of the fiber A included in the nonwoven fabric layer (A) of Example 11 was changed to 700 nm. The thickness ratio (A/B) of the nonwoven fabric layer (A) and the nonwoven fabric layer (B) was 0.11. The variation of the single fiber diameter of the fiber A included in the nonwoven fabric layer (A) was 5.6%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had low stiffness and tensile strength, and high adhesion. When the face mask using the laminated nonwoven fabric was subjected to monitor evaluation as reference information, favorable results of adhesion feeling: A and handling properties: A were provided.

Example 14

A laminated nonwoven fabric having a basis weight of 30.4 g/m² was obtained in the same manner as in Example 11 except that the design basis weight of the laminated nonwoven fabric was changed to 30 g/m². The thickness ratio (A/B) of the nonwoven fabric layer (A) and the nonwoven fabric layer (B) was 0.05. The variation of the single fiber diameter of the fiber A included in the nonwoven fabric layer (A) was 6.7%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had low stiffness and tensile strength, and high adhesion. When the face mask using the laminated nonwoven fabric was subjected to monitor evaluation as reference information, favorable results of adhesion feeling: A+ and handling properties: B were provided.

Example 15

A laminated nonwoven fabric having a basis weight of 64.3 g/m² was obtained in the same manner as in Example 11 except that the design basis weight of the laminated nonwoven fabric was changed to 64 g/m². The thickness ratio (A/B) of the nonwoven fabric layer (A) and the nonwoven fabric layer (B) was 0.58. The variation of the single fiber diameter of the fiber A included in the nonwoven fabric layer (A) was 7.0%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had relatively low stiffness and tensile strength, and relatively high adhesion. When the face mask using the laminated nonwoven fabric was subjected to monitor evaluation as reference information, relatively favorable results of adhesion feeling: B and handling properties: A were provided.

Example 16

A laminated nonwoven fabric having a basis weight of 47.4 g/m² was obtained in the same manner as in Example 11 except that the nonwoven fabric layer (A) was disposed on one surface of the nonwoven fabric layer (B) of Example 11 and the nonwoven fabric configuration was changed to A/B. The thickness ratio (A/B) of the nonwoven fabric layer (A) and the nonwoven fabric layer (B) was 0.10. The variation of the single fiber diameter of the fiber A included in the nonwoven fabric layer (A) was 6.8%.

Next, the laminated nonwoven fabric was punched into a mask shape to prepare a face mask. The nonwoven fabric configurations of the laminated nonwoven fabric of the present Example were summarized in Table 3, and the physical properties and the like of the laminated nonwoven fabric were summarized in Table 4. The laminated nonwoven fabric had low stiffness and tensile strength, and high adhesion. When the face mask using the laminated nonwoven fabric was subjected to monitor evaluation as reference information, very favorable results of adhesion feeling: A+ and handling properties: A were provided.

Comparative Example 1

A laminated nonwoven fabric having a basis weight of 54.3 g/m² was obtained in the same manner as in Example 1 except that the content rate of the rayon fiber (single fiber diameter: 7 μm, wet strength: 0.9 cN/dtex, cut length: 38 mm) included in the nonwoven fabric layer (B) of Example 1 was changed to 50%, and the content rate of the PET fiber (single fiber diameter: 12 μm, wet strength: 4.3 cN/dtex, cut length: 51 mm) was changed to 50%. The thickness ratio (A/B) of the nonwoven fabric layer (A) and the nonwoven fabric layer (B) was 0.16. The variation of the single fiber diameter of the fiber A included in the nonwoven fabric layer (A) was 32.3%.

Next, the laminated nonwoven fabric was punched into a mask shape to prepare a face mask. The nonwoven fabric configurations of the laminated nonwoven fabric of the present Comparative Example were summarized in Table 5, and the physical properties and the like of the laminated nonwoven fabric were summarized in Table 6. The laminated nonwoven fabric had low stiffness and tensile strength, and high adhesion. When the face mask using the laminated nonwoven fabric was subjected to monitor evaluation as reference information, relatively poor results of adhesion feeling: A+ and handling properties: C were provided.

Comparative Example 2

A laminated nonwoven fabric having a basis weight of 53.8 g/m² was obtained in the same manner as in Example 1 except that the fiber included in the nonwoven fabric layer (B) of Example 1 was changed to 100% of a rayon fiber (single fiber diameter: 7 μm, wet strength: 0.9 cN/dtex, cut length: 38 mm). The thickness ratio (A/B) of the nonwoven fabric layer (A) and the nonwoven fabric layer (B) was 0.11. The variation of the single fiber diameter of the fiber A included in the nonwoven fabric layer (A) was 31.2%.

Next, the laminated nonwoven fabric was punched into a mask shape to prepare a face mask. The nonwoven fabric configurations of the laminated nonwoven fabric of the present Comparative Example were summarized in Table 5, and the physical properties and the like of the laminated nonwoven fabric were summarized in Table 6. The laminated nonwoven fabric had low stiffness and tensile strength, and high adhesion. When the face mask using the laminated nonwoven fabric was subjected to monitor evaluation as reference information, poor results of adhesion feeling: A+ and handling properties: D were provided.

Comparative Example 3

A laminated nonwoven fabric having a basis weight of 53.7 g/m² was obtained in the same manner as in Example 1 except that the content rate of the rayon fiber (single fiber diameter: 7 μm, wet strength: 0.9 cN/dtex, cut length: 38 mm) included in the nonwoven fabric layer (B) of Example 1 was changed to 10%, and the content rate of the PET fiber (single fiber diameter: 12 μm, wet strength: 4.3 cN/dtex, cut length: 51 mm) was changed to 90%. The thickness ratio (A/B) of the nonwoven fabric layer (A) and the nonwoven fabric layer (B) was 0.14. The variation of the single fiber diameter of the fiber A included in the nonwoven fabric layer (A) was 31.9%.

Next, the laminated nonwoven fabric was punched into a mask shape to prepare a face mask. The nonwoven fabric configurations of the laminated nonwoven fabric of the present Comparative Example were summarized in Table 5, and the physical properties and the like of the laminated nonwoven fabric were summarized in Table 6. The laminated nonwoven fabric had relatively high stiffness and tensile strength, and relatively low adhesion. When the face mask using the laminated nonwoven fabric was subjected to monitor evaluation as reference information, relatively poor results of adhesion feeling: C and handling properties: A were provided.

Comparative Example 4

A laminated nonwoven fabric having a basis weight of 54.5 g/m² was obtained in the same manner as in Example 2 except that the rayon fiber (single fiber diameter: 7 μm, wet strength: 0.9 cN/dtex, cut length: 38 mm) included in the nonwoven fabric layer (B) of Example 2 was changed to a cotton fiber (single fiber diameter: 15 μm, wet strength: 2.3 cN/dtex, cut length: 25 mm). The thickness ratio (A/B) of the nonwoven fabric layer (A) and the nonwoven fabric layer (B) was 0.16. The variation of the single fiber diameter of a fiber A included in the nonwoven fabric layer (A) was 32.0%.

Next, the laminated nonwoven fabric was punched into a mask shape to prepare a face mask. The nonwoven fabric configurations of the laminated nonwoven fabric of the present Comparative Example were summarized in Table 5, and the physical properties and the like of the laminated nonwoven fabric were summarized in Table 6. The laminated nonwoven fabric had high stiffness and tensile strength, and low adhesion. When the face mask using the laminated nonwoven fabric was subjected to monitor evaluation as reference information, poor results of adhesion feeling: D and handling properties: A were provided.

Comparative Example 5

A laminated nonwoven fabric having a basis weight of 54.6 g/m² was obtained in the same manner as in Example 2 except that the rayon fiber (single fiber diameter: 7 μm, wet strength: 0.9 cN/dtex, cut length: 38 mm) included in the nonwoven fabric layer (B) of Example 2 was changed to a lyocell fiber (single fiber diameter: 12 μm, wet strength: 2.7 cN/dtex, cut length: 38 mm). The thickness ratio (A/B) of the nonwoven fabric layer (A) and the nonwoven fabric layer (B) was 0.14. The variation of the single fiber diameter of the fiber A included in the nonwoven fabric layer (A) was 30.3%.

Next, the laminated nonwoven fabric was punched into a mask shape to prepare a face mask. The nonwoven fabric configurations of the laminated nonwoven fabric of the present Comparative Example were summarized in Table 5, and the physical properties and the like of the laminated nonwoven fabric were summarized in Table 6. The laminated nonwoven fabric had high stiffness and tensile strength, and low adhesion. When the face mask using the laminated nonwoven fabric was subjected to monitor evaluation as reference information, poor results of adhesion feeling: D and handling properties: A were provided.

Comparative Example 6

A laminated nonwoven fabric having a basis weight of 54.5 g/m² was obtained in the same manner as in Comparative Example 2 except that the rayon fiber (single fiber diameter: 7 μm, wet strength: 0.9 cN/dtex, cut length: 38 mm) included in the nonwoven fabric layer (B) of Comparative Example 2 was changed to a PET fiber (single fiber diameter: 12 μm, wet strength: 4.3 cN/dtex, cut length: 51 mm). The thickness ratio (A/B) of the nonwoven fabric layer (A) and the nonwoven fabric layer (B) was 0.11. The variation of the single fiber diameter of the fiber A included in the nonwoven fabric layer (A) was 31.5%.

Next, the laminated nonwoven fabric was punched into a mask shape to prepare a face mask. The nonwoven fabric configurations of the laminated nonwoven fabric of the present Comparative Example were summarized in Table 5, and the physical properties and the like of the laminated nonwoven fabric were summarized in Table 6. The laminated nonwoven fabric had high stiffness and tensile strength, and low adhesion. When the face mask using the laminated nonwoven fabric was subjected to monitor evaluation as reference information, poor results of adhesion feeling: D and handling properties: A were provided.

TABLE 1-1

| | | | | Unit | | Example 1 | Example 2 | Example 3 | Example 4 |
|---|---|---|---|---|---|---|---|---|---|
| Nonwoven fabric configuration | Nonwoven fabric layer | Fiber A | Material | — | | N6 | N6 | N6 | N6 |
| | | | Single fiber diameter | nm | MAX | 302 | 292 | 290 | 300 |

TABLE 1-1-continued

|  |  |  |  | Unit | Example 1 | Example 2 | Example 3 | Example 4 |
|---|---|---|---|---|---|---|---|---|
|  | (A) |  | Variation of single fiber diameter (*1) | MIN % | 75 30.0 | 77 31.4 | 78 32.1 | 76 32.0 |
|  |  |  | Variation of single fiber diameter (*2) | % | 24.1 | 25.2 | 25.8 | 25.6 |
|  | Nonwoven fabric layer (B) | Fiber B1 | Material | — | Rayon | Rayon | Rayon | Rayon |
|  |  |  | Single fiber diameter | μm MAX | 9.6 | 8.9 | 9.2 | 13.9 |
|  |  |  |  | MIN | 5.6 | 5.8 | 5.6 | 11.2 |
|  |  |  | Wet strength | cN/dtex | 0.9 | 0.9 | 0.9 | 1.2 |
|  |  |  | Content | % by mass | 15 | 30 | 40 | 30 |
|  |  |  | Content based on the entire laminated nonwoven fabric (*3) | % by mass | 11 | 22 | 30 | 22 |
|  |  | Fiber B2 | Material | — | PET | PET | PET | PET |
|  |  |  | Single fiber diameter | μm MAX | 16.9 | 14.8 | 16.2 | 16.4 |
|  |  |  |  | MIN | 11.5 | 10.6 | 8.4 | 10.5 |
|  |  |  | Wet strength | cN/dtex | 4.3 | 4.3 | 4.3 | 4.3 |
|  |  |  | Content | % by mass | 85 | 70 | 60 | 70 |
|  |  |  | Material | — | — | — | — | — |
|  |  |  | Single fiber diameter | μm MAX | — | — | — | — |
|  |  |  |  | MIN | — | — | — | — |
|  |  |  | Wet strength | cN/dtex | — | — | — | — |
|  |  |  | Content | % by mass | — | — | — | — |
|  | Layer configuration of laminated nonwoven fabric (*5) |  |  | — | A/B/A | A/B/A | A/B/A | A/B/A |

TABLE 1-2

|  |  |  |  | Unit | Example 5 | Example 6 | Example 7 | Example 8 |
|---|---|---|---|---|---|---|---|---|
| Nonwoven fabric configuration | Nonwoven fabric layer (A) | Fiber A | Material | — | N6 | N6 | N6 | N6 |
|  |  |  | Single fiber diameter | nm MAX | 310 | 295 | 303 | 340 |
|  |  |  |  | MIN | 72 | 75 | 74 | 86 |
|  |  |  | Variation of single fiber diameter (*1) | % | 32.2 | 30.6 | 30.4 | 26.0 |
|  |  |  | Variation of single fiber diameter (*2) | % | 25.7 | 24.8 | 24.5 | 21.3 |
|  | Nonwoven fabric layer (B) | Fiber B1 | Material | — | Rayon | Rayon | Rayon | Rayon |
|  |  |  | Single fiber diameter | μm MAX | 14.2 | 17.3 | 20.1 | 9.0 |
|  |  |  |  | MIN | 11.0 | 13.8 | 16.2 | 6.1 |
|  |  |  | Wet strength | cN/dtex | 1.2 | 1.6 | 1.8 | 0.9 |
|  |  |  | Content | % by mass | 20 | 30 | 30 | 40 |
|  |  |  | Content based on the entire laminated nonwoven fabric (*3) | % by mass | 15 | 22 | 22 | 30 |
|  |  | Fiber B2 | Material | — | PET | PET | PET | PET |
|  |  |  | Single fiber diameter | μm MAX | 16.6 | 15.8 | 14.9 | 16.6 |
|  |  |  |  | MIN | 10.2 | 9.5 | 11.2 | 10.7 |
|  |  |  | Wet strength | cN/dtex | 4.3 | 4.3 | 4.3 | 4.3 |
|  |  |  | Content | % by mass | 80 | 70 | 70 | 60 |
|  |  |  | Material | — | — | — | — | — |
|  |  |  | Single fiber diameter | μm MAX | — | — | — | — |
|  |  |  |  | MIN | — | — | — | — |
|  |  |  | Wet strength | cN/dtex | — | — | — | — |
|  |  |  | Content | % by mass | — | — | — | — |
|  | Layer configuration of laminated nonwoven fabric (*5) |  |  | — | A/B/A | A/B/A | A/B/A | A/B/A |

PET: polyethylene terephthalate

N6: nylon 6

(*1): Variation of the single fiber diameter of a fiber A when the fiber A is a fiber having a single fiber diameter of 50-800 nm.

(*2): Variation of the single fiber diameter of a fiber A when the fiber A is a fiber having a single fiber diameter of 100-400 nm.

(*3): A content of a fiber B1 having wet strength of 2.0 cN/dtex or less in the entire laminated nonwoven fabric when a fiber B having wet strength of 2.0 cN/dtex or less is any of a regenerated fiber, a semi-synthetic fiber, and an animal natural fiber.

(*5): "A/B/A" is a layer configuration of "nonwoven fabric layer (A)/nonwoven fabric layer (B)/nonwoven fabric layer (A)", and "A/B" is a layer configuration of "nonwoven fabric layer (A)/nonwoven fabric layer (B)".

TABLE 2-1

|  |  | Unit | Example 1 | Example 2 | Example 3 | Example 4 |
|---|---|---|---|---|---|---|
| Physical property | Basis weight | g/m² | 54.5 | 54.2 | 54.0 | 54.1 |
|  | Thickness | mm | 0.43 | 0.41 | 0.40 | 0.42 |
|  | Thickness ratio of layer A and layer B | A/B | 0.25 | 0.25 | 0.19 | 0.14 |
|  | Stiffness (Softness) | mN | 0.15 | 0.14 | 0.14 | 0.15 |
|  | Tensile strength (Flexibility) | N/25 mm | 47 | 22 | 19 | 37 |
|  | Coefficient of static friction | — | 2.1 | 2.0 | 2.0 | 2.1 |
|  | Mass retention of lotion (Liquid retention) | % by mass | 82 | 83 | 84 | 82 |
|  | Adhesion | N | 1.20 | 1.23 | 1.24 | 1.22 |
| Monitor evaluation 1 (*4) | Adhesion feeling | — | B | A+ | A+ | A |
|  | handling properties | — | A | A | A | A |

TABLE 2-2

|  |  | Unit | Example 5 | Example 6 | Example 7 | Example 8 |
|---|---|---|---|---|---|---|
| Physical property | Basis weight | g/m² | 54.4 | 54.7 | 54.6 | 54.0 |
|  | Thickness | mm | 0.42 | 0.44 | 0.43 | 0.40 |
|  | Thickness ratio of layer A and layer B | A/B | 0.11 | 0.11 | 0.14 | 0.16 |
|  | Stiffness (Softness) | mN | 0.15 | 0.16 | 0.17 | 0.14 |
|  | Tensile strength (Flexibility) | N/25 mm | 38 | 40 | 44 | 19 |
|  | Coefficient of static friction | — | 2.2 | 2.2 | 2.2 | 2.2 |
|  | Mass retention of lotion (Liquid retention) | % by mass | 81 | 80 | 82 | 84 |
|  | Adhesion | N | 1.21 | 1.20 | 1.19 | 1.25 |
| Monitor evaluation 1 (*4) | Adhesion feeling | — | A | B | B | A+ |
|  | handling properties | — | A | A | A | A |

(*4): Monitor evaluation is reference information.

TABLE 3-1

|  |  |  |  |  | Unit |  | Example 9 | Example 10 | Example 11 | Example 12 |
|---|---|---|---|---|---|---|---|---|---|---|
| Nonwoven fabric configuration | Nonwoven fabric layer (A) | Fiber A | Material |  | — |  | N6 | N6 | N6 | N6 |
|  |  |  | Single fiber diameter | nm | MAX |  | 345 | 337 | 331 | 380 |
|  |  |  |  |  | MIN |  | 105 | 127 | 199 | 288 |
|  |  |  | Variation of single fiber diameter (*1) |  | % |  | 15.1 | 9.8 | 6.5 | 4.1 |
|  |  |  | Variation of single fiber diameter (*2) |  | % |  | 15.1 | 9.8 | 6.5 | 4.1 |
|  | Nonwoven fabric layer (B) | Fiber B1 | Material |  | — |  | Rayon | Rayon | Rayon | Rayon |
|  |  |  | Single fiber diameter | μm | MAX |  | 9.3 | 9.5 | 9.5 | 9.6 |
|  |  |  |  |  | MIN |  | 5.8 | 5.8 | 6.2 | 5.9 |
|  |  |  | Wet strength |  | cN/dtex |  | 0.9 | 0.9 | 0.9 | 0.9 |
|  |  |  | Content |  | % by mass |  | 40 | 40 | 40 | 40 |
|  |  |  | Content based on the entire laminated nonwoven fabric (*3) |  | % by mass |  | 30 | 30 | 30 | 30 |
|  |  | Fiber B2 | Material |  | — |  | PET | PET | PET | PET |
|  |  |  | Single fiber diameter | μm | MAX |  | 16.9 | 16.8 | 14.8 | 14.8 |
|  |  |  |  |  | MIN |  | 9.2 | 8.9 | 8.8 | 10.5 |
|  |  |  | Wet strength |  | cN/dtex |  | 4.3 | 4.3 | 4.3 | 4.3 |
|  |  |  | Content |  | % by mass |  | 60 | 60 | 60 | 60 |
|  |  |  | Material |  | — |  | — | — | — | — |

TABLE 3-1-continued

|  |  |  |  | Unit |  | Example 9 | Example 10 | Example 11 | Example 12 |
|---|---|---|---|---|---|---|---|---|---|
|  |  |  | Single fiber diameter | μm | MAX | — | — | — | — |
|  |  |  |  |  | MIN | — | — | — | — |
|  |  |  | Wet strength | cN/dtex |  | — | — | — | — |
|  |  |  | Content | % by mass |  | — | — | — | — |
|  | Layer configuration of laminated nonwoven fabric (*5) |  |  | — |  | A/B/A | A/B/A | A/B/A | A/B/A |

TABLE 3-2

|  |  |  |  | Unit |  | Example 13 | Example 14 | Example 15 | Example 16 |
|---|---|---|---|---|---|---|---|---|---|
| Nonwoven fabric configuration | Nonwoven fabric layer (A) | Fiber A | Material | — |  | N6 | N6 | N6 | N6 |
|  |  |  | Single fiber diameter | nm | MAX | 789 | 331 | 325 | 302 |
|  |  |  |  |  | MIN | 604 | 214 | 208 | 205 |
|  |  |  | Variation of single fiber diameter (*1) | % |  | 5.6 | 6.7 | 7.0 | 6.8 |
|  |  |  | Variation of single fiber diameter (*2) | % |  | — | 6.7 | 7.0 | 6.8 |
|  | Nonwoven fabric layer (B) | Fiber B1 | Material | — |  | Rayon | Rayon | Rayon | Rayon |
|  |  |  | Single fiber diameter | μm | MAX | 9.1 | 8.9 | 8.9 | 9.5 |
|  |  |  |  |  | MIN | 6.0 | 6.3 | 5.6 | 5.6 |
|  |  |  | Wet strength | cN/dtex |  | 0.9 | 0.9 | 0.9 | 0.9 |
|  |  |  | Content | % by mass |  | 40 | 40 | 40 | 40 |
|  |  |  | Content based on the entire laminated nonwoven fabric (*3) | % by mass |  | 30 | 27 | 31 | 34 |
|  |  | Fiber B2 | Material | — |  | PET | PET | PET | PET |
|  |  |  | Single fiber diameter | μm | MAX | 16.5 | 16.2 | 14.9 | 16.1 |
|  |  |  |  |  | MIN | 10.4 | 9.7 | 9.4 | 8.7 |
|  |  |  | Wet strength | cN/dtex |  | 4.3 | 4.3 | 4.3 | 4.3 |
|  |  |  | Content | % by mass |  | 60 | 60 | 60 | 60 |
|  |  |  | Material | — |  | — | — | — | — |
|  |  |  | Single fiber diameter | μm | MAX | — | — | — | — |
|  |  |  |  |  | MIN | — | — | — | — |
|  |  |  | Wet strength | cN/dtex |  | — | — | — | — |
|  |  |  | Content | % by mass |  | — | — | — | — |
|  | Layer configuration of laminated nonwoven fabric (*5) |  |  | — |  | A/B/A | A/B/A | A/B/A | A/B |

PET: polyethylene terephthalate
N6: nylon 6
(*1): Variation of the single fiber diameter of a fiber A when the fiber A is a fiber having a single fiber diameter of 50-800 nm.
(*2): Variation of the single fiber diameter of a fiber A when the fiber A is a fiber having a single fiber diameter of 100-400 nm.
(*3): A content of a fiber B1 having wet strength of 2.0 cN/dtex or less in the entire laminated nonwoven fabric when a fiber B having wet strength of 2.0 cN/dtex or less is any of a regenerated fiber, a semi-synthetic fiber, and an animal natural fiber.
(*5): "A/B/A" is a layer configuration of "nonwoven fabric layer (A)/nonwoven fabric layer (B)/nonwoven fabric layer (A)", and "A/B" is a layer configuration of "nonwoven fabric layer (A)/nonwoven fabric layer (B)".

TABLE 4-1

|  |  | Unit | Example 9 | Example 10 | Example 11 | Example 12 |
|---|---|---|---|---|---|---|
| Physical property | Basis weight | g/m² | 54.2 | 54.2 | 54.1 | 54.2 |
|  | Thickness | mm | 0.40 | 0.41 | 0.40 | 0.40 |
|  | Thickness ratio of layer A and layer B | A/B | 0.19 | 0.19 | 0.14 | 0.19 |
|  | Stiffness(Softness) | mN | 0.14 | 0.14 | 0.14 | 0.14 |
|  | Tensile strength (Flexibility) | N/25 mm | 18 | 18 | 18 | 18 |
|  | Coefficient of static friction | — | 2.4 | 2.6 | 2.9 | 2.4 |
|  | Mass retention of lotion (Liquid retention) | % by mass | 83 | 83 | 84 | 83 |
|  | Adhesion | N | 1.26 | 1.28 | 1.35 | 1.23 |
| Monitor evaluation 1 (*4) | Adhesion feeling | — | A+ | A+ | A+ | A |
|  | handling properties | — | A | A | A | A |

TABLE 4-2

| | | Unit | Example 13 | Example 14 | Example 15 | Example 16 |
|---|---|---|---|---|---|---|
| Physical property | Basis weight | g/m² | 54.0 | 30.4 | 64.3 | 47.4 |
| | Thickness | mm | 0.41 | 0.31 | 1.22 | 0.37 |
| | Thickness ratio of layer A and layer B | A/B | 0.11 | 0.05 | 0.58 | 0.10 |
| | Stiffness(Softness) | mN | 0.14 | 0.12 | 0.18 | 0.14 |
| | Tensile strength (Flexibility) | N/25 mm | 19 | 15 | 48 | 18 |
| | Coefficient of static friction | — | 2.0 | 2.8 | 2.7 | 2.7 |
| | Mass retention of lotion (Liquid retention) | % by mass | 83 | 84 | 83 | 83 |
| | Adhesion | N | 1.21 | 1.34 | 1.18 | 1.34 |
| Monitor evaluation 1 (*4) | Adhesion feeling | — | A | A+ | B | A+ |
| | handling properties | — | A | B | A | A |

(*4): Monitor evaluation is reference information.

TABLE 5-1

| | | | | | Unit | Comparative Example 1 | Comparative Example 2 | Comparative Example 3 |
|---|---|---|---|---|---|---|---|---|
| Nonwoven fabric configuration | Nonwoven fabric layer (A) | Fiber A | | Material | — | N6 | N6 | N6 |
| | | | | Single fiber diameter | nm MAX | 323 | 297 | 326 |
| | | | | | MIN | 75 | 70 | 76 |
| | | | | Variation of single fiber diameter (*1) | % | 32.3 | 31.2 | 31.9 |
| | | | | Variation of single fiber diameter (*2) | % | 25.8 | 24.6 | 25.5 |
| | Nonwoven fabric layer (B) | Fiber B1 | | Material | — | Rayon | Rayon | Rayon |
| | | | | Single fiber diameter | μm MAX | 9.6 | 9.1 | 9.3 |
| | | | | | MIN | 6.1 | 6.2 | 5.9 |
| | | | | Wet strength | cN/dtex | 0.9 | 0.9 | 0.9 |
| | | | | Content | % by mass | 50 | 100 | 10 |
| | | | | Content based on the entire laminated nonwoven fabric (*3) | % by mass | 37 | 74 | 7 |
| | | Fiber B2 | | Material | — | PET | — | PET |
| | | | | Single fiber diameter | μm MAX | 15.7 | — | 15.2 |
| | | | | | MIN | 10.5 | — | 10.6 |
| | | | | Wet strength | cN/dtex | 4.3 | — | 4.3 |
| | | | | Content | % by mass | 50 | — | 90 |
| | | | | Material | — | — | — | — |
| | | | | Single fiber diameter | μm MAX | — | — | — |
| | | | | | MIN | — | — | — |
| | | | | Wet strength | cN/dtex | — | — | — |
| | | | | Content | % by mass | — | — | — |
| | Layer configuration of laminated nonwoven fabric (*5) | | | | — | A/B/A | A/B/A | A/B/A |

TABLE 5-2

| | | | | | Unit | Comparative Example 4 | Comparative Example 5 | Comparative Example 6 |
|---|---|---|---|---|---|---|---|---|
| Nonwoven fabric configuration | Nonwoven fabric layer (A) | Fiber A | | Material | — | N6 | N6 | N6 |
| | | | | Single fiber diameter | nm MAX | 330 | 321 | 316 |
| | | | | | MIN | 77 | 71 | 75 |
| | | | | Variation of single fiber diameter (*1) | % | 32.0 | 30.3 | 31.5 |
| | | | | Variation of single fiber diameter (*2) | % | 25.7 | 24.7 | 24.8 |
| | Nonwoven fabric layer (B) | Fiber B1 | | Material | — | — | — | — |
| | | | | Single fiber diameter | μm MAX | — | — | — |
| | | | | | MIN | — | — | — |
| | | | | Wet strength | cN/dtex | — | — | — |
| | | | | Content | % by mass | — | — | — |

TABLE 5-2-continued

|  |  | Unit | Comparative Example 4 | Comparative Example 5 | Comparative Example 6 |
|---|---|---|---|---|---|
|  | Content based on the entire laminated nonwoven fabric (*3) | % by mass | — | — | — |
| Fiber B2 | Material | — | Cotton | Lyocell | PET |
|  | Single fiber diameter μm MAX | | 20.3 | 14.0 | 16.8 |
|  | MIN | | 10.9 | 11.0 | 11.4 |
|  | Wet strength | cN/dtex | 2.3 | 2.7 | 4.3 |
|  | Content | % by mass | 30 | 30 | 100 |
|  | Material | — | PET | PET | — |
|  | Single fiber diameter μm MAX | | 16.6 | — | — |
|  | MIN | | 11.4 | — | — |
|  | Wet strength | cN/dtex | 4.3 | 4.3 | — |
|  | Content | % by mass | 70 | 70 | — |
| Layer configuration of laminated nonwoven fabric (*5) | | — | A/B/A | A/B/A | A/B/A |

PET: polyethylene terephthalate
N6: nylon 6
(*1): Variation of the single fiber diameter of a fiber A when the fiber A is a fiber having a single fiber diameter of 50-800 nm.
(*2): Variation of the single fiber diameter of a fiber A when the fiber A is a fiber having a single fiber diameter of 100-400 nm.
(*3): A content of a fiber B1 having wet strength of 2.0 cN/dtex or less in the entire laminated nonwoven fabric when a fiber B having wet strength of 2.0 cN/dtex or less is any of a regenerated fiber, a semi-synthetic fiber, and an animal natural fiber.
(*5): "A/B/A" is a layer configuration of "nonwoven fabric layer (A)/nonwoven fabric layer (B)/nonwoven fabric layer (A)", and "A/B" is a layer configuration of "nonwoven fabric layer (A)/nonwoven fabric layer (B)".

TABLE 6-1

|  |  | Unit | Comparative Example 1 | Comparative Example 2 | Comparative Example 3 |
|---|---|---|---|---|---|
| Physical property | Basis weight | g/m² | 54.3 | 53.8 | 53.7 |
|  | Thickness | mm | 0.42 | 0.38 | 0.39 |
|  | Thickness ratio of layer A and layer B | A/B | 0.16 | 0.11 | 0.14 |
|  | Stiffness (Softness) | mN | 0.11 | 0.10 | 0.19 |
|  | Tensile strength (Flexibility) | N/25 mm | 14 | 9 | 54 |
|  | Coefficient of static friction | — | 2.0 | 2.1 | 2.0 |
|  | Mass retention of lotion (Liquid retention) | % by mass | 85 | 89 | 70 |
|  | Adhesion | N | 1.25 | 1.26 | 1.15 |
| Monitor evaluation 1 (*4) | Adhesion feeling | — | A+ | A+ | C |
|  | handling properties | — | C | D | A |

TABLE 6-2

|  |  | Unit | Comparative Example 4 | Comparative Example 5 | Comparative Example 6 |
|---|---|---|---|---|---|
| Physical property | Basis weight | g/m² | 54.5 | 54.6 | 54.5 |
|  | Thickness | mm | 0.43 | 0.43 | 0.43 |
|  | Thickness ratio of layer A and layer B | A/B | 0.16 | 0.14 | 0.11 |
|  | Stiffness (Softness) | mN | 0.21 | 0.20 | 0.23 |
|  | Tensile strength (Flexibility) | N/25 mm | 55 | 57 | 68 |
|  | Coefficient of static friction | — | 2.1 | 2.0 | 2.0 |
|  | Mass retention of lotion (Liquid retention) | % by mass | 73 | 72 | 70 |
|  | Adhesion | N | 1.18 | 1.14 | 1.09 |
| Monitor evaluation 1 (*4) | Adhesion feeling | — | D | D | D |
|  | handling properties | — | A | A | A |

(*4): Monitor evaluation is reference information.

Next, Examples of the present invention 2 and Comparative Examples will be described.

(Example 17)
(Sea-Island Type Conjugate Fiber)

Polyethylene terephthalate (PET, melt viscosity: 160 Pa·s) as an island component and PET copolymerized with 8.0 mol % of 5-sodium sulfoisophthalic acid (copolymerized PET, melt viscosity: 95 Pa·s) as a sea component were separately melted at 290° C., and then weighed. A known composite spinneret (for example, a composite spinneret having arrangement disclosed in FIG. 6 (b) of WO 12/173116) was incorporated. The sea and island components were flowed into a spinning pack using a distribution plate in which 1000 distribution holes were formed for island component per one discharge hole so that the composite ratio of the sea and island components was set to 20/80, and a composite polymer stream was discharged from discharge holes to perform melt spinning, thereby obtaining an undrawn fiber. This was drawn at a drawing speed of 800 m/min to obtain sea-island type conjugate fibers of 150 dtex-15 filaments. The obtained sea-island type conjugate fiber exhibited excellent properties: strength of 3.6 cN/dtex and a degree of elongation of 30%.

(Crimping-Cutting Step)

The filament including the sea-island type conjugate fiber was crimped (12 crimps/25 mm), and then cut into 51 mm short fibers.

(Nonwoven Fabric Layer (A))

The sea-island type conjugate fiber was opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric of 12.5 g/m². The nonwoven fabric was treated with a 1% aqueous sodium hydroxide solution at a temperature of 95° C. and a bath ratio of 1:40 for a treatment time of 30 minutes, to remove a sea component, thereby obtaining a nonwoven fabric layer (A) including a PET fiber A and having a basis weight of 10 g/m². The single fiber diameter of the fiber A included in the nonwoven fabric layer (A) was 700 nm.

(Nonwoven Fabric Layer (B))

A short fiber made of polyethylene terephthalate (PET) and having a single fiber diameter of 14 µm and a cut length of 51 mm was opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric layer (B) of 50 g/m².

(Laminated Nonwoven Fabric)

The nonwoven fabric layer (A) and nonwoven fabric layer (B) obtained above were laminated, and entangled with a high pressure water stream under conditions of a pressure of 10 MPa and a velocity of 1.0 m/min, to obtain a laminated nonwoven fabric having a basis weight of 60 g/m². The variation of the single fiber diameter of the fiber A included in the nonwoven fabric layer (A) was 4.9%.

Furthermore, the laminated nonwoven fabric was punched into a mask shape to prepare a face mask. The nonwoven fabric configurations of the face mask of the present Example were summarized in Table 1, and the physical properties and the like of the face mask were summarized in Table 2. The face mask had a relatively high coefficient of static friction and adhesion. As a result of monitor evaluation, adhesion feeling and lift-up feeling after 20 minutes were relatively favorable.

Example 18

A laminated nonwoven fabric having a basis weight of 60 g/m² was obtained in the same manner as in Example 17 except that the single fiber diameter of the fiber A included in the nonwoven fabric layer (A) of Example 17 was changed to 300 nm. The variation of the single fiber diameter of the fiber A included in the nonwoven fabric layer (A) was 4.3%. Next, the laminated nonwoven fabric was punched into a mask shape to prepare a face mask. The nonwoven fabric configurations of the face mask of the present Example were summarized in Table 1, and the physical properties and the like of the face mask were summarized in Table 2. The face mask had a high coefficient of static friction and relatively high adhesion. As a result of monitor evaluation, adhesion feeling and lift-up feeling after 20 minutes were relatively favorable.

Example 19

A laminated nonwoven fabric having a basis weight of 60 g/m² was obtained in the same manner as in Example 17 except that the single fiber diameter of the fiber A included in the nonwoven fabric layer (A) of Example 17 was changed to 230 nm. The variation of the single fiber diameter of the fiber A included in the nonwoven fabric layer (A) was 5.0%.

Next, the laminated nonwoven fabric was punched into a mask shape to prepare a face mask. The nonwoven fabric configurations of the face mask of the present Example were summarized in Table 1, and the physical properties and the like of the face mask were summarized in Table 2. The face mask had a high coefficient of static friction and extremely high adhesion. As a result of monitor evaluation, both adhesion feeling and lift-up feeling after 20 minutes were favorable. Here, both the adhesion feeling and the lift-up feeling after 20 minutes are considered to be favorable because of the influence of the single fiber diameter of the fiber A included in the nonwoven fabric layer (A) used for the laminated nonwoven fabric of Example 19.

(Example 20)
(Sea-Island Type Conjugate Fiber)

Sea-island composite fibers of 217 dtex-100 filaments were obtained in the same manner as in Example 17 except that nylon 6 (N6, melt viscosity: 190 Pa·s) was used for an island component, and a spinning temperature was changed to 270° C. The obtained sea-island type conjugate fiber exhibited excellent properties: strength of 3.5 cN/dtex, and a degree of elongation of 34%.

(Crimping-Cutting Step)

The filament including the sea-island type conjugate fiber was crimped (12 crimps/25 mm), and then cut into 51 mm short fibers.

(Nonwoven Fabric Layer (A))

The sea-island type conjugate fiber was opened by a carding machine, and the opened fiber was then made into a web by a crosslap webber. The web was entangled with a high pressure water stream under conditions of a pressure of 3 MPa and a velocity of 1.0 m/min, to obtain a nonwoven fabric of 11.1 g/m². The nonwoven fabric was treated with a 1% aqueous sodium hydroxide solution at a temperature of 95° C. and a bath ratio of 1:40 for a treatment time of 30 minutes, to remove a sea component, thereby obtaining a nonwoven fabric layer (A) including a N6 fiber A and having a basis weight of 10 g/m². The single fiber diameter of the fiber A included in the nonwoven fabric layer (A) was 700 nm.

(Nonwoven Fabric Layer (B))

In the same manner as in Example 17, a nonwoven fabric layer (B) was obtained.

(Laminated Nonwoven Fabric)

The nonwoven fabric layer (A) and nonwoven fabric layer (B) obtained above were laminated, to obtain a laminated nonwoven fabric having a basis weight of 60 g/m² in the same manner as in Example 17. The variation of the single fiber diameter of the fiber A included in the nonwoven fabric layer (A) was 5.5%.

Furthermore, the laminated nonwoven fabric was punched into a mask shape to prepare a face mask. The nonwoven fabric configurations of the face mask of the present Example were summarized in Table 1, and the physical properties and the like of the face mask were summarized in Table 2. The face mask had a relatively high coefficient of static friction and adhesion. As a result of monitor evaluation, adhesion feeling after 20 minutes was favorable, and lift-up feeling was relatively favorable. Here, both the adhesion feeling after 20 minutes is considered to be favorable because of the influence of the water absorbability of the material of the fiber A included in the nonwoven fabric layer (A) used for the laminated nonwoven fabric of Example 20.

Example 21

A laminated nonwoven fabric having a basis weight of 60 g/m² was obtained in the same manner as in Example 20 except that the single fiber diameter of the fiber A included in the nonwoven fabric layer (A) of Example 20 was changed to 300 nm. The variation in the single fiber diameter of the fiber A included in the nonwoven fabric layer (A) was 4.2%.

Next, the laminated nonwoven fabric was punched into a mask shape to prepare a face mask. The nonwoven fabric configurations of the face mask of the present Example were summarized in Table 1, and the physical properties and the like of the face mask were summarized in Table 2. The face mask had a high coefficient of static friction and adhesion. As a result of monitor evaluation, both adhesion feeling and lift-up feeling after 20 minutes were favorable. Here, both the adhesion feeling and the lift-up feeling after 20 minutes are considered to be favorable because of the influence of the single fiber diameter of the fiber A included in the nonwoven fabric layer (A) used for the laminated nonwoven fabric of Example 21.

Example 22

A laminated nonwoven fabric having a basis weight of 60 g/m² was obtained in the same manner as in Example 20 except that the single fiber diameter of the fiber A included in the nonwoven fabric layer (A) of Example 20 was changed to 230 nm. The variation of the single fiber diameter of the fiber A included in the nonwoven fabric layer (A) was 6.5%.

Next, the laminated nonwoven fabric was punched into a mask shape to prepare a face mask. The nonwoven fabric configurations of the face mask of the present Example were summarized in Table 1, and the physical properties and the like of the face mask were summarized in Table 2. The face mask had an extremely high coefficient of static friction and adhesion. As a result of monitor evaluation, both adhesion feeling and lift-up feeling after 20 minutes were extremely favorable. Here, both the adhesion feeling and the lift-up feeling after 20 minutes are considered to be extremely favorable because of the influence of the single fiber diameter of the fiber A included in the nonwoven fabric layer (A) used for the laminated nonwoven fabric of Example 22.

Example 23

A laminated nonwoven fabric layer having a basis weight of 60 g/m² was obtained in the same manner as in Example 20 except that the arrangement pattern of distribution plate holes was a known arrangement pattern (for example, an arrangement pattern disclosed in FIG. 6 (a) of WO 12/173116); a distribution plate in which 3000 distribution holes were formed for island component per one discharge hole was used; the composite ratio of sea and island components was changed to 85/15; nylon 6 (N6, melt viscosity: 190 Pa·s) was used for an island component; a spinning temperature set to 270° C.; and the single fiber diameter of the fiber A included in the nonwoven fabric layer (A) was changed to 230 nm. The variation of the single fiber diameter of the fiber A included in the nonwoven fabric layer (A) was 9.8%.

Next, the laminated nonwoven fabric was punched into a mask shape to prepare a face mask. The nonwoven fabric configurations of the face mask of the present Example were summarized in Table 3, and the physical properties and the like of the face mask were summarized in Table 4. The face mask had a relatively high coefficient of static friction and high adhesion. As a result of monitor evaluation, both adhesion feeling and lift-up feeling after 20 minutes were favorable. Here, both the adhesion feeling and the lift-up feeling after 20 minutes are considered to be favorable because of the influence of the variation of the single fiber diameter of the fiber A included in the nonwoven fabric layer (A) used for the laminated nonwoven fabric of Example 23.

Example 24

A laminated nonwoven fabric having a basis weight of 60 g/m² was obtained in the same manner as in Example 23 except that the composite ratio of the sea and island components of Example 23 was set to 50/50. The variation of the single fiber diameter of the fiber A included in the nonwoven fabric layer (A) was 14.7%.

Next, the laminated nonwoven fabric was punched into a mask shape to prepare a face mask. The nonwoven fabric configurations of the face mask of the present Example were summarized in Table 3, and the physical properties and the like of the face mask were summarized in Table 4. The face mask had a relatively high coefficient of static friction and adhesion. As a result of monitor evaluation, adhesion feeling after 20 minutes was relatively favorable, and lift-up feeling was favorable. Here, the adhesion feeling after 20 minutes is considered to be relatively favorable because of the influence of the variation of the single fiber diameter of the fiber A included in the nonwoven fabric layer (A) used for the laminated nonwoven fabric of Example 24.

Example 25

A laminated nonwoven fabric having a basis weight of 60 g/m² was obtained in the same manner as in Example 20 except that the single fiber diameter of the fiber A included in the nonwoven fabric layer (A) of Example 20 was changed to 230 nm, and the single fiber diameter of the fiber B included in the nonwoven fabric layer (B) of Example 20 was changed to 40 µm. The variation of the single fiber diameter of the fiber A included in the nonwoven fabric layer (A) was 6.8%.

Next, the laminated nonwoven fabric was punched into a mask shape to prepare a face mask. The nonwoven fabric configurations of the face mask of the present Example were summarized in Table 3, and the physical properties and the like of the face mask were summarized in Table 4. The face mask had a high coefficient of static friction and relatively high adhesion. As a result of monitor evaluation, both adhesion feeling and lift-up feeling after 20 minutes were relatively favorable. Here, the lift-up feeling after 20 minutes is considered to be relatively favorable because of the influence of the single fiber diameter of the fiber B included in the nonwoven fabric layer (B) used for the laminated nonwoven fabric of Example 25.

Example 26

A laminated nonwoven fabric having a basis weight of 60 g/m$^2$ was obtained in the same manner as in Example 22 except that a short fiber of nylon 6 including the sea-island type conjugate fiber of Example 22 and a short fiber of nylon 6 having a single fiber diameter of 14 µm and a cut length of 51 mm were mixed so that a mass ratio after sea-removing was set to 80:20; the mixed fibers were opened by a carding machine, and the opened fibers were then made into a web by a crosslap webber; and the nonwoven fabric layer (A) of Example 22 was changed to a nonwoven fabric layer (A) having a basis weight of 10 g/m$^2$. The variation of the single fiber diameter of the fiber A included in the nonwoven fabric layer (A) was 6.7%.

Next, the laminated nonwoven fabric was punched into a mask shape to prepare a face mask. The nonwoven fabric configurations of the face mask of the present Example were summarized in Table 3, and the physical properties and the like of the face mask were summarized in Table 4. The face mask had a relatively high coefficient of static friction and adhesion. As a result of monitor evaluation, both adhesion feeling and lift-up feeling after 20 minutes were relatively favorable. Here, both the adhesion feeling and the lift-up feeling after 20 minutes are considered to be relatively favorable because of the influence of the content of the fiber A included in the nonwoven fabric layer (A) used for the laminated nonwoven fabric of Example 26.

Example 27

A laminated nonwoven fabric having a basis weight of 60 g/m$^2$ was obtained in the same manner as in Example 22 except that a PET short fiber having a single fiber diameter of 14 µm and a cut length of 51 mm and a PET short fiber including the sea-island type conjugate fiber of Example 19 were mixed so that a mass ratio after sea-removing was set to 80:20; the mixed fibers were opened by a carding machine, and the opened fibers were then made into a web by a crosslap webber; and the nonwoven fabric layer (B) of Example 22 was changed to a nonwoven fabric layer (B) having a basis weight of 50 g/m$^2$. The variation of the single fiber diameter of the fiber A included in the nonwoven fabric layer (A) was 7.0%.

Next, the laminated nonwoven fabric was punched into a mask shape to prepare a face mask. The nonwoven fabric configurations of the face mask of the present Example were summarized in Table 3, and the physical properties and the like of the face mask were summarized in Table 4. The face mask had a very high coefficient of static friction and relatively high adhesion. As a result of monitor evaluation, adhesion feeling after 20 minutes was extremely favorable, and lift-up feeling was relatively favorable. Here, the lift-up feeling after 20 minutes is considered to be relatively favorable because of the influence of the content of the fiber B included in the nonwoven fabric layer (B) used for the laminated nonwoven fabric of Example 27.

Comparative Example 7

The polyethylene terephthalate (PET) short fiber used for the nonwoven fabric layer (B) of Example 17 was opened by a carding machine, and the opened fiber was then made into a web by a crosslap webber. The web was entangled with a high pressure water stream under conditions of a pressure of 3 MPa, 10 MPa and a velocity of 1.0 m/min, to obtain a single layer nonwoven fabric having a basis weight of 60 g/m$^2$.

Next, the laminated nonwoven fabric was punched into a mask shape to prepare a face mask. The nonwoven fabric configurations of the face mask of the present Comparative Example were summarized in Table 5, and the physical properties and the like of the face mask were summarized in Table 6. The face mask had an extremely low coefficient of static friction and adhesion. As a result of monitor evaluation, both adhesion feeling and lift-up feeling after 20 minutes were extremely poor. Here, the adhesion feeling and the lift-up feeling after 20 minutes are considered to be extremely poor because the single layer nonwoven fabric of Comparative Example 7 does not have the nonwoven fabric layer (A).

Comparative Example 8

A single layer nonwoven fabric having a basis weight of 60 g/m$^2$ was obtained in the same manner as in Comparative Example 7 except that the fiber included in the nonwoven fabric layer (B) of Comparative Example 7 was changed to a cotton fiber having a single fiber diameter of 14 µm.

Next, the laminated nonwoven fabric was punched into a mask shape to prepare a face mask. The nonwoven fabric configurations of the face mask of the present Comparative Example were summarized in Table 5, and the physical properties and the like of the face mask were summarized in Table 6. The face mask had an extremely low coefficient of static friction and adhesion. As a result of monitor evaluation, both adhesion feeling and lift-up feeling after 20 minutes were extremely poor. Here, both the adhesion feeling and the lift-up feeling after 20 minutes are considered to be extremely poor because the single layer nonwoven fabric of Comparative Example 8 does not have the nonwoven fabric layer (A).

Comparative Example 9

A laminated nonwoven fabric having a basis weight of 60 g/m$^2$ was obtained in the same manner as in Example 22 except that the fiber B included in the nonwoven fabric layer (B) of Example 22 was changed to a PET split yarn having a single fiber diameter of 2 µm. The variation of the single fiber diameter of the fiber A included in the nonwoven fabric layer (A) was 6.3%.

Next, the laminated nonwoven fabric was punched into a mask shape to prepare a face mask. The nonwoven fabric configurations of the face mask of the present Comparative Example were summarized in Table 5, and the physical properties and the like of the face mask were summarized in Table 6. The face mask had a high coefficient of static friction and low adhesion. As a result of monitor evaluation, adhesion feeling after 20 minutes was extremely favorable, and lift-up feeling was extremely poor. Here, the lift-up feeling after 20 minutes is considered to be extremely poor because of the influence of the single fiber diameter of the fiber B included in the nonwoven fabric layer (B) used for the laminated nonwoven fabric of Comparative Example 9.

Comparative Example 10

The short fiber of the sea-island type conjugate fiber used for the nonwoven fabric layer (A) of Example 22 was opened by a carding machine, and the opened fiber was then made into a web by a crosslap webber. The web was entangled with a high pressure water stream under conditions of a pressure of 3 MPa, 10 MPa and a velocity of 1.0 m/min, to obtain a nonwoven fabric having a basis weight of 62.5 g/m$^2$. The nonwoven fabric was treated with a 1% aqueous sodium hydroxide solution at a temperature of 95° C. and a bath ratio of 1:40 for a treatment time of 30 minutes, to remove a sea component, thereby obtaining a single layer nonwoven fabric including only the nonwoven fabric layer (A) and having a basis weight of 60 g/m$^2$. The variation of the single fiber diameter of the fiber A included in the nonwoven fabric layer (A) was 6.1%.

Next, the laminated nonwoven fabric was punched into a mask shape to prepare a face mask. The nonwoven fabric configurations of the face mask of the present Comparative Example were summarized in Table 5, and the physical properties and the like of the face mask were summarized in Table 6. The face mask had an extremely high coefficient of static friction and adhesion. As a result of monitor evaluation, adhesion feeling after 20 minutes was extremely favorable, and lift-up feeling was extremely poor. Here, the lift-up feeling after 20 minutes are considered to be extremely poor because the single layer nonwoven fabric of Comparative Example 10 does not have the nonwoven fabric layer (B).

Comparative Example 11

(Polymer Alloy Fiber) Nylon 6 having a melt viscosity of 212 Pa·s (262° C., shear rate: 121.6 sec$^{-1}$) and a melting point of 220° C. (N6) (40% by mass), and poly L-lactic acid (60% by mass) having a weight average molecular weight of 120,000, a melt viscosity of 30 Pa·s (240° C., shear rate: 2432 sec$^{-1}$), a melting point of 170° C., and an optical purity of 99.5% or more were separately weighed, and separately supplied into a twin screw extrusion kneader to be described in detail later, followed by kneading at 220° C. to obtain a polymer alloy chip.
Screw shape: Same direction complete meshing type double-thread screw
Screw: diameter: 37 mm, effective length: 1670 mm, L/D=45.1
  Kneading section length: 28% of screw effectiveness
  A kneading section was positioned on a discharge side by ⅓ of a screw effective length.
  Three backflow sections were present on the way.
Bent: 2 places
The obtained polymer alloy chip was supplied into a single-screw extrusion type melting apparatus for a staple spinning machine, to perform melt spinning at a melt temperature of 235° C., a spinning temperature of 235° C. (spinneret surface temperature: 220° C.), and a spinning speed of 1200 m/min, thereby obtaining a polymer alloy fiber. This was subjected to multiple winding, and then subjected to steam drawing, to obtain a tow including a polymer alloy fiber having a single yarn fineness of 3.0 dtex. The obtained polymer alloy fiber exhibited excellent properties: strength of 3.5 cN/dtex, a degree of elongation of 45%, and U %=1.0%.
(Crimping-Cutting Step)
The tow including the polymer alloy fiber was crimped (12 crimps/25 mm), and then cut into a 51 mm short fiber.
(Nonwoven Fabric Layer (A))
A nonwoven fabric layer (A) having a basis weight of 10 g/m$^2$ was obtained in the same manner as in Example 17 except that the fiber A included in the nonwoven fabric layer (A) of Example 17 was changed to the polymer alloy short fiber. The single fiber diameter of a fiber A included in the nonwoven fabric layer (A) was 230 nm.
(Nonwoven Fabric Layer (B))
In the same manner as in Example 17, a nonwoven fabric layer (B) was obtained.
(Laminated Nonwoven Fabric)
The nonwoven fabric layer (A) and nonwoven fabric layer (B) obtained above were laminated, to obtain a laminated nonwoven fabric having a basis weight of 60 g/m$^2$ in the same manner as in Example 17. The variation of the single fiber diameter of a fiber A included in the nonwoven fabric layer (A) was 32.0%.

Furthermore, the laminated nonwoven fabric was punched into a mask shape to prepare a face mask. The nonwoven fabric configurations of the face mask of the present Comparative Example were summarized in Table 5, and the physical properties and the like of the face mask were summarized in Table 6. The face mask had a low coefficient of static friction and adhesion. As a result of monitor evaluation, both adhesion feeling and lift-up feeling after 20 minutes were poor. Here, both the adhesion feeling and the lift-up feeling after 20 minutes are considered to be poor because of the influence of the variation of the single fiber diameter of the fiber A included in the nonwoven fabric layer (A) used for the laminated nonwoven fabric of Comparative Example 11.

Comparative Example 12

A laminated nonwoven fabric having a basis weight of 60 g/m$^2$ was obtained in the same manner as in Example 17 except that a known pipe type sea-island composite spinneret (number of islands per one discharge hole: 1000) described in Japanese Patent Laid-Open Publication No. 2001-192924 was used, and the island component was changed to nylon 6 (N6, melt viscosity: 190 Pa·s). The variation of the single fiber diameter of the fiber A included in the nonwoven fabric layer (A) was 26.3%.

Next, the laminated nonwoven fabric was punched into a mask shape to prepare a face mask. The nonwoven fabric configurations of the face mask of the present Example were summarized in Table 5, and the physical properties and the like of the face mask were summarized in Table 6. The face mask had a low coefficient of static friction and adhesion. As a result of monitor evaluation, both adhesion feeling and lift-up feeling after 20 minutes were poor. Here, both the adhesion feeling and the lift-up feeling after 20 minutes are considered to be poor because of the influence of the variation of the single fiber diameter of the fiber A included in the nonwoven fabric layer (A) used for the laminated nonwoven fabric of Comparative Example 12.

TABLE 7

| | | | | Unit | Example 17 | Example 18 | Example 19 | Example 20 | Example 21 | Example 22 |
|---|---|---|---|---|---|---|---|---|---|---|
| Nonwoven fabric configuration | Nonwoven fabric layer A | Fiber A | Material | — | PET | PET | PET | N6 | N6 | N6 |
| | | | Average single fiber diameter (*1) | nm | 700 | 300 | 230 | 700 | 300 | 230 |
| | | | Single fiber diameter MAX | nm | 757 | 330 | 256 | 792 | 383 | 335 |
| | | | Single fiber diameter MIN | | 653 | 215 | 198 | 601 | 280 | 195 |
| | | | Variation of single fiber diameter (*2) | % | 4.9 | 4.3 | 5.0 | 5.5 | 4.2 | 6.5 |
| | | | Variation of single fiber diameter (*3) | % | — | 4.3 | 5.0 | — | 4.2 | 6.5 |
| | | | Content | % by mass | 100 | 100 | 100 | 100 | 100 | 100 |
| | | Basis weight | | g/m² | 10 | 10 | 10 | 10 | 10 | 10 |
| | Nonwoven fabric layer B | Fiber B | Material | — | PET | PET | PET | PET | PET | PET |
| | | | Average single fiber diameter | μm | 14 | 14 | 14 | 14 | 14 | 14 |
| | | | Content | % by mass | 100 | 100 | 100 | 100 | 100 | 100 |
| | | Basis weight | | g/m² | 50 | 50 | 50 | 50 | 50 | 50 |

(*1): An average single fiber diameter of a fiber A when the fiber A is a fiber having a single fiber diameter of 50-800 nm.
(*2): Variation of the single fiber diameter of a fiber A when the fiber A is a fiber having a single fiber diameter of 50-800 nm.
(*3) Variation of the single fiber diameter of a fiber A when the fiber A is a fiber having a single fiber diameter of 100-400 nm.

TABLE 8

| | | Unit | Example 17 | Example 18 | Example 19 | Example 20 | Example 21 | Example 22 |
|---|---|---|---|---|---|---|---|---|
| Physical property | 10% tensile stress in a cross direction in a wet state | N/50 mm | 4.1 | 2.0 | 3.6 | 2.5 | 3.4 | 2.2 |
| | Mass retention of lotion | % | 80 | 81 | 85 | 83 | 85 | 87 |
| | Coefficient of static friction | — | 1.51 | 2.13 | 2.63 | 2.01 | 2.40 | 2.94 |
| | Adhesion | N | 1.20 | 1.22 | 1.29 | 1.21 | 1.24 | 1.33 |
| Monitor evaluation 2 (Reference information) | Adhesion feeling after 20 minutes | — | C | C | B | B | B | A |
| | Lift-up feeling after 20 minutes | — | C | C | B | C | B | A |

TABLE 9

| | | | | Unit | Example 23 | Example 24 | Example 25 | Example 26 | Example 27 |
|---|---|---|---|---|---|---|---|---|---|
| Nonwoven fabric configuration | Nonwoven fabric layer A | Fiber A | Material | — | N6 | N6 | N6 | N6 | N6 |
| | | | Average single fiber diameter (*1) | nm | 230 | 230 | 230 | 230 | 230 |
| | | | Single fiber diameter MAX | nm | 340 | 345 | 330 | 332 | 328 |
| | | | Single fiber diameter MIN | | 131 | 111 | 206 | 215 | 207 |
| | | | Variation of single fiber diameter (*2) | % | 9.8 | 14.7 | 6.8 | 6.7 | 7.0 |
| | | | Variation of single fiber diameter (*3) | % | 9.8 | 14.7 | 6.8 | 6.7 | 7.0 |
| | | | Content | % by mass | 100 | 100 | 100 | 80 | 100 |
| | | Basis weight | | g/m² | 10 | 10 | 10 | 10 | 10 |
| | Nonwoven fabric layer B | Fiber B | Material | — | PET | PET | PET | PET | PET |
| | | | Average single fiber diameter | μm | 14 | 14 | 40 | 14 | 14 |
| | | | Content | % by mass | 100 | 100 | 100 | 100 | 80 |
| | | Basis weight | | g/m² | 50 | 50 | 50 | 50 | 50 |

(*1): An average single fiber diameter of a fiber A when the fiber A is a fiber having a single fiber diameter of 50-800 nm.
(*2): Variation of the single fiber diameter of a fiber A when the fiber A is a fiber having a single fiber diameter of 50-800 nm.
(*3) Variation of the single fiber diameter of a fiber A when the fiber A is a fiber having a single fiber diameter of 100-400 nm.

TABLE 10

|  |  | Unit | Example 23 | Example 24 | Example 25 | Example 26 | Example 27 |
|---|---|---|---|---|---|---|---|
| Physical property | 10% tensile stress in a cross direction in a wet state | N/50 mm | 2.3 | 2.7 | 6.5 | 2.3 | 1.6 |
|  | Mass retention of lotion | % | 84 | 80 | 82 | 81 | 82 |
|  | Coefficient of static friction | — | 2.22 | 2.05 | 2.47 | 1.91 | 2.73 |
|  | Adhesion | N | 1.25 | 1.23 | 0.98 | 1.20 | 1.22 |
| Monitor evaluation 2 (Reference information) | Adhesion feeling after 20 minutes | — | B | C | C | D | A |
|  | Lift-up feeling after 20 minutes | — | B | B | D | C | C |

TABLE 11-1

|  |  |  |  | Unit | Comparative Example 7 | Comparative Example 8 | Comparative Example 9 |
|---|---|---|---|---|---|---|---|
| Nonwoven fabric configuration | Nonwoven fabric layer A | Fiber A | Material |  | — |  | N6 |
|  |  |  | Average single fiber diameter (*1) | nm |  |  | 230 |
|  |  |  | Single fiber diameter MAX | nm |  |  | 326 |
|  |  |  | Single fiber diameter MIN |  |  |  | 202 |
|  |  |  | Variation of single fiber diameter (*2) | % |  |  | 6.3 |
|  |  |  | Variation of single fiber diameter(*3) | % |  |  | 6.3 |
|  |  |  | Content | % by mass |  |  | 100 |
|  |  |  | Basis weight | g/m² |  |  | 10 |
|  | Nonwoven fabric layer B | Fiber B | Material | — | PET | Cotton | PET |
|  |  |  | Average single fiber diameter | μm | 14 | 14 | 2 |
|  |  |  | Content | % by mass | 100 | 100 | 100 |
|  |  |  | Basis weight | g/m² | 60 | 60 | 50 |

TABLE 11-2

|  |  |  |  | Unit | Comparative Example 10 | Comparative Example 11 | Comparative Example 12 |
|---|---|---|---|---|---|---|---|
| Nonwoven fabric configuration | Nonwoven fabric layer A | Fiber A | Material | — | N6 | N6 | N6 |
|  |  |  | Average single fiber diameter (*1) | nm | 230 | 230 | 230 |
|  |  |  | Single fiber diameter MAX | nm | 315 | 291 | 342 |
|  |  |  | Single fiber diameter MIN |  | 208 | 79 | 85 |
|  |  |  | Variation of single fiber diameter (*2) | % | 6.1 | 32.0 | 26.3 |
|  |  |  | Variation of single fiber diameter(*3) | % | 6.1 | 25.8 | 21.6 |
|  |  |  | Content | % by mass | 100 | 100 | 100 |
|  |  |  | Basis weight | g/m² | 60 | 10 | 10 |
|  | Nonwoven fabric layer B | Fiber B | Material | — |  | PET | PET |
|  |  |  | Average single fiber diameter | μm |  | 14 | 14 |
|  |  |  | Content | % by mass |  | 100 | 100 |
|  |  |  | Basis weight | g/m² |  | 50 | 50 |

(*1): An average single fiber diameter of a fiber A when the fiber A is a fiber having a single fiber diameter of 50-800 nm.
(*2): Variation of the single fiber diameter of a fiber A when the fiber A is a fiber having a single fiber diameter of 50-800 nm.
(*3)Variation of the single fiber diameter of a fiber A when the fiber A is a fiber having a single fiber diameter of 100-400 nm.

TABLE 12-1

|  |  | Unit | Comparative Example 7 | Comparative Example 8 | Comparative Example 9 |
|---|---|---|---|---|---|
| Physical property | 10% tensile stress in a cross direction in a wet state | N/50 mm | 2.1 | 0.7 | 1.1 |
|  | Mass retention of lotion | % | 74 | 62 | 80 |
|  | Coefficient of static friction | — | 0.91 | 0.45 | 2.53 |
|  | Adhesion | N | 0.61 | 0.59 | 1.02 |
| Monitor evaluation 2 (Reference information) | Adhesion feeling after 20 minutes | — | E | E | A |
|  | Lift-up feeling after 20 minutes | — | E | E | E |

TABLE 12-2

|  |  | Unit | Comparative Example 10 | Comparative Example 11 | Comparative Example 12 |
|---|---|---|---|---|---|
| Physical property | 10% tensile stress in a cross direction in a wet state | N/50 mm | 0.8 | 2.1 | 2.9 |
|  | Mass retention of lotion | % | 83 | 81 | 80 |
|  | Coefficient of static friction | — | 2.61 | 1.42 | 1.50 |
|  | Adhesion | N | 1.25 | 0.97 | 1.06 |
| Monitor evaluation 2 (Reference information) | Adhesion feeling after 20 minutes | — | A | D | D |
|  | Lift-up feeling after 20 minutes | — | E | D | D |

The invention claimed is:

1. A laminated nonwoven fabric comprising a nonwoven fabric layer (A) and a nonwoven fabric layer (B), wherein
the nonwoven fabric layer (A) is formed from a fiber A having a single fiber diameter of 50 nm or more and 800 nm or less,
the nonwoven fabric layer (B) is formed from a fiber B having a single fiber diameter of 3 μm or more and 30 μm or less,
the nonwoven fabric layer (B) includes 15 to 40% by mass of a fiber B1 based on all of the fibers constituting the nonwoven fabric layer (B), the fiber having tensile strength of 2.0 cN/dtex or less as measured based on JIS L 1015: 2010 8.7.2,
the nonwoven fabric layer (B) includes a fiber B2 having tensile strength exceeding 2.0 cN/dtex as measured based on JIS L 1015: 2010 8.7.2, and
the nonwoven fabric layer (A) is disposed as an outermost layer of at least one surface.

2. The laminated nonwoven fabric according to claim 1, wherein
the laminated nonwoven fabric has wet stiffness of 0.12 mN or more and 0.18 mN or less as measured based on JIS L 1913: 2010.6.7.3, and
the laminated nonwoven fabric has wet tensile strength of 15 N/25 mm or more and 50 N/25 mm or less as measured based on JIS L 1913: 2010.6.3.2.

3. The laminated nonwoven fabric according to claim 1, wherein
the laminated nonwoven fabric has a basis weight of 30 g/m² or more and 65 g/m² or less, and
the laminated nonwoven fabric has a thickness of 0.3 mm or more and 1.3 mm or less.

4. The laminated nonwoven fabric according to claim 3, wherein a thickness ratio (A/B) of the nonwoven fabric layer (A) to the nonwoven fabric layer (B) is 0.05 or more and 0.67 or less.

5. The laminated nonwoven fabric according to claim 1, wherein the fiber B1 having tensile strength of 2.0 cN/dtex or less as measured based on JIS L 1015: 2010 8.7.2 has a single fiber diameter of 3 μm or more and 8 μm or less.

6. The laminated nonwoven fabric according to claim 1, wherein a variation of the single fiber diameter of the fiber A is 1.0 to 20.0%.

7. The laminated nonwoven fabric according to claim 1, wherein the fiber A has a single fiber diameter of 100 nm or more and 400 nm or less.

8. The laminated nonwoven fabric according to claim 1, wherein the fiber A is a polyamide fiber.

9. The laminated nonwoven fabric according to claim 1, wherein
the nonwoven fabric layer (B) includes the fiber B which is a polyester fiber, and
a content of the fiber B which is the polyester fiber to the total mass of the nonwoven fabric layer (B) is 60% by mass or more and 85% by mass or less.

10. The laminated nonwoven fabric according to claim 1, wherein
the fiber B1 having tensile strength of 2.0 cN/dtex or less as measured based on JIS L 1015: 2010 8.7.2 is a regenerated fiber, a semi-synthetic fiber, or an animal natural fiber, and the fiber B1 is included in an amount of 9 to 36% by mass based on the entire laminated nonwoven fabric.

11. The laminated nonwoven fabric according to claim 1, wherein a coefficient of static friction of a surface of the laminated nonwoven fabric which is the nonwoven fabric layer (A) disposed as an outermost layer with respect to a simulated silicon skin surface is 1.5 or more.

12. A face mask comprising the laminated nonwoven fabric according to claim 1.

* * * * *